(12) United States Patent
Temple

(10) Patent No.: US 11,846,454 B2
(45) Date of Patent: Dec. 19, 2023

(54) HEAT PUMP UTILIZING THERMAL ENERGY STORAGE

(71) Applicant: Will John Temple, Placerville, CA (US)

(72) Inventor: Will John Temple, Placerville, CA (US)

( * ) Notice: Subject to any disclaimer, the term of this patent is extended or adjusted under 35 U.S.C. 154(b) by 132 days.

(21) Appl. No.: 16/554,322

(22) Filed: Aug. 28, 2019

(65) Prior Publication Data

US 2020/0393173 A1 Dec. 17, 2020

Related U.S. Application Data

(60) Provisional application No. 62/921,413, filed on Jun. 13, 2019.

(51) Int. Cl.
*F25B 30/06* (2006.01)
*F25B 27/00* (2006.01)
*F25B 30/02* (2006.01)

(52) U.S. Cl.
CPC .............. *F25B 30/06* (2013.01); *F25B 27/00* (2013.01); *F25B 30/02* (2013.01); *F25B 2400/13* (2013.01); *F25B 2400/16* (2013.01)

(58) Field of Classification Search
CPC .......... F25B 30/06; F25B 27/00; F25B 30/02; F25B 2400/24; F28D 20/021; F28D 2200/123; F28D 2220/10; F24D 2220/10; Y02E 60/14; C09K 5/063
See application file for complete search history.

(56) References Cited

U.S. PATENT DOCUMENTS

| | | | | |
|---|---|---|---|---|
| 4,964,279 A | * | 10/1990 | Osborne | F25D 16/00 62/201 |
| 6,393,861 B1 | * | 5/2002 | Levenduski | F25B 39/04 62/181 |
| 2003/0042014 A1 | * | 3/2003 | Jin | F25B 13/00 62/238.7 |
| 2006/0096308 A1 | * | 5/2006 | Manole | F25B 9/008 62/277 |
| 2019/0072339 A1 | * | 3/2019 | Wirz | F24H 7/0233 |
| 2019/0226735 A1 | * | 7/2019 | Bissell | F28D 20/021 |
| 2019/0264933 A1 | * | 8/2019 | Ignatiev | F25B 13/00 |

* cited by examiner

*Primary Examiner* — Elizabeth J Martin

(57) ABSTRACT

A heat pump system for the use of cooling or heating comprising at least one TES (3), wherein the TES comprises thermal energy storage. The TES is placed downstream of a heat exchanger (2) and generally placed upstream of a pressure changing device (4) or regenerator (40), wherein the TES exchanges heat energy with a fluid (14) of the heat pump, and wherein the heat pump system exchanges heat energy between an enclosed space (6) and an ambient heat source outside the enclosed space. The TES is generally charged with thermal energy, which may be cool or heat energy, during favorable times of a daily temperature cycle. The TES then transfers the stored thermal energy to assist in cooling or heating the enclosed space.

28 Claims, 10 Drawing Sheets

HEAT PUMP UTILIZING THERMAL ENERGY STORAGE

CROSS-REFERENCE TO RELATED APPLICATIONS

This application claims the benefit of PPA Ser. No. 62/921,413 filed 2019 Jun. 13 by the present inventor, which is incorporated by reference.

BACKGROUND

Field of Invention

The disclosed embodiments relate generally to utilizing thermal energy storage with heat pumps.

Description of Prior Art

Thermal energy storage is currently in use in some applications involving heat pumps. Heat pumps are commonly used for heating and cooling buildings and other structures. Heat pumps move or pump heat energy from one source to another. One common embodiment is a ground source heat pump. These systems generally rely on utilizing the ground as a large thermal mass to provide seasonal thermal energy storage.

Ground source heat pumps have the following disadvantages: First, a large amount of earth, or other mass, needs to be accessed. This often requires boring deep holes in the earth, or digging substantial trenches. Boring and/or digging add considerable cost. Further, an installer has to check for buried obstacles, such as pipes. Also, boring and digging require energy that is often carbon sourced, increasing the payback period of such systems.

If a water source in utilized, then this limits the suitable places to locations where a water source is available. Further, if heat is extracted all winter, the thermal mass gets cooler reducing the efficiency of the heat pump at the end of the season. Likewise, in Summer, heat is inserted and the efficiency drops at the end of Summer for cooling purposes.

Further, the ground source temperature generally averages the average yearly temperature at the location of installation. This is often at a differential that is still at a considerable temperature differential from the output temperature desired from the heat pump. While a ground source is often at a smaller temperature differential and gradient than the outside air, which a common air sourced heat pump would use, it is still not ideal and a smaller temperature differential is desirable for greater efficiency.

Another solution for thermal energy storage is daily thermal storage. This technique utilizes the natural variation between nighttime temperatures and daytime temperatures. In temperate climates, in which a significant percentage of the population lives in, the average nighttime low temperature during summer is fairly close to the desired indoor temperature of a building. Likewise, the average high temperature during winter in temperate climates is often at a moderate gradient to the desired indoor temperature. The problem is that heat needs to be added to a building during the night, at a time when it is coldest. Likewise, in Summer the majority of heat that needs to be removed from the building is needed during the hottest time of the day, and early evening, when the gradient and temperature differential is at its highest.

Daily thermal energy storage provides a solution to this problem by transferring heat at more favorable temperature gradients/differentials, and thus with greater efficiency, from or to the building. This can be done with daily thermal storage by essentially delaying the transferring of heat energy from the interior of a building to the outside by about 12 hours to take advantage of a reduced temperature gradient/differential to provide increased efficiency.

Another advantage of daily thermal energy storage is that is requires vastly less thermal mass to accomplish higher energy efficiency compared to seasonal storage. Storing half a day's worth of heat storage can take around two magnitudes less material compared to ground source storage which generally stores a whole season's worth of heat energy, which is to considerable advantage.

For these reasons, daily thermal energy has been adopted in a few examples. One example is to add mass to the building. This, however, requires adding significant cost to the building or cost to retrofit a building.

Another example in use today is the technique of making ice at night. This cold thermal energy is then used to cool the building during the day. However, due to the large temperature differential of summertime nightly temperatures to the temperature of ice, making ice is not an efficient process. Making ice is generally done not to save electricity, but to defer electricity use to nighttime when the electric rates are lower. Ice making strategies generally result in greater energy inefficiencies and create more carbon emissions, provided the electrical generation is with fossil fuels. In the future, there is no guarantee that nighttime rates will be lower, as there may be an excess of solar power.

Another strategy is to cool a chiller of water at night, and then use the cool water to cool a building during the day. This requires a relatively large amount of mass, comprising a tank of water. This mass is more mass than is in many of the embodiments of the present invention described below. Many of the embodiment described below will be exclusive from utilizing water as a thermal energy storage medium. However, some may use water.

One concern is that adding thermal energy storage to a heater or cooling (air conditioning) system has a payback, and it is desirable for the payback to be a short period of time. This is in terms of both energy efficiency and money.

Some thermal energy storage systems use phase change materials (PCMs). Commonly used PCMs include hydrated salts, eutectic salts, and paraffins. PCMs may be organic, inorganic, inorganic eutectics, hygroscopic materials, solid-solid PCM materials, or any other phase change material.

Solar cooling is also common, as is using another heat source in absorption refrigeration systems. These utilize an absorption cycle sometimes using desiccants or a refrigerant in a transport medium. These systems either need a solar collector, or a source of heat which is often powered with fossil fuels. These systems are often more complex and expensive than other heat pumps, and often have low COPs. Many of the PCM elements of embodiments disclosed within may be exclusive from use in an absorption cycle, and some fluids or other elements may be exclusive from desiccants or refrigerants being transported by another transport medium, such as water. Examples are NH3/H2O or Ammonia/Water, Water/Lithium Bromide, Water/Lithium Chloride, Water/Silica Gel or Water/Zeolite, or Methanol/Activated Carbon.

What is needed is a solution for effectively utilizing the natural variation in daily temperatures to best advantage, with small cost and quick payback. It is also an advantage for a solution to be added to existing buildings with a small amount of installation work, and without significantly changing the interior or structure of a building. Many of the embodiments of the present invention can be installed without changes to the inside of a building.

What is also needed is cost effective solutions that enable a large number of buildings to be converted to using electric power in place of fossil fuels for heating. Electric power is on a path to using fewer fossil fuels for generation. So efficient use of electric power for heating and cooling can lead to greater and greater savings in carbon emissions as time goes by. What is also needed is a solution to expand regions in which heat pumps are practical for heating in the wintertime.

BRIEF DESCRIPTION OF THE DRAWINGS

For a better understanding of the embodiments of the invention, as well as additional embodiments thereof, reference should be made to the Description of Embodiments below, in conjunction with the following drawings, in which like reference numerals refer to corresponding parts throughout the figures.

REFERENCE NUMERALS IN DRAWINGS

Figure 1:
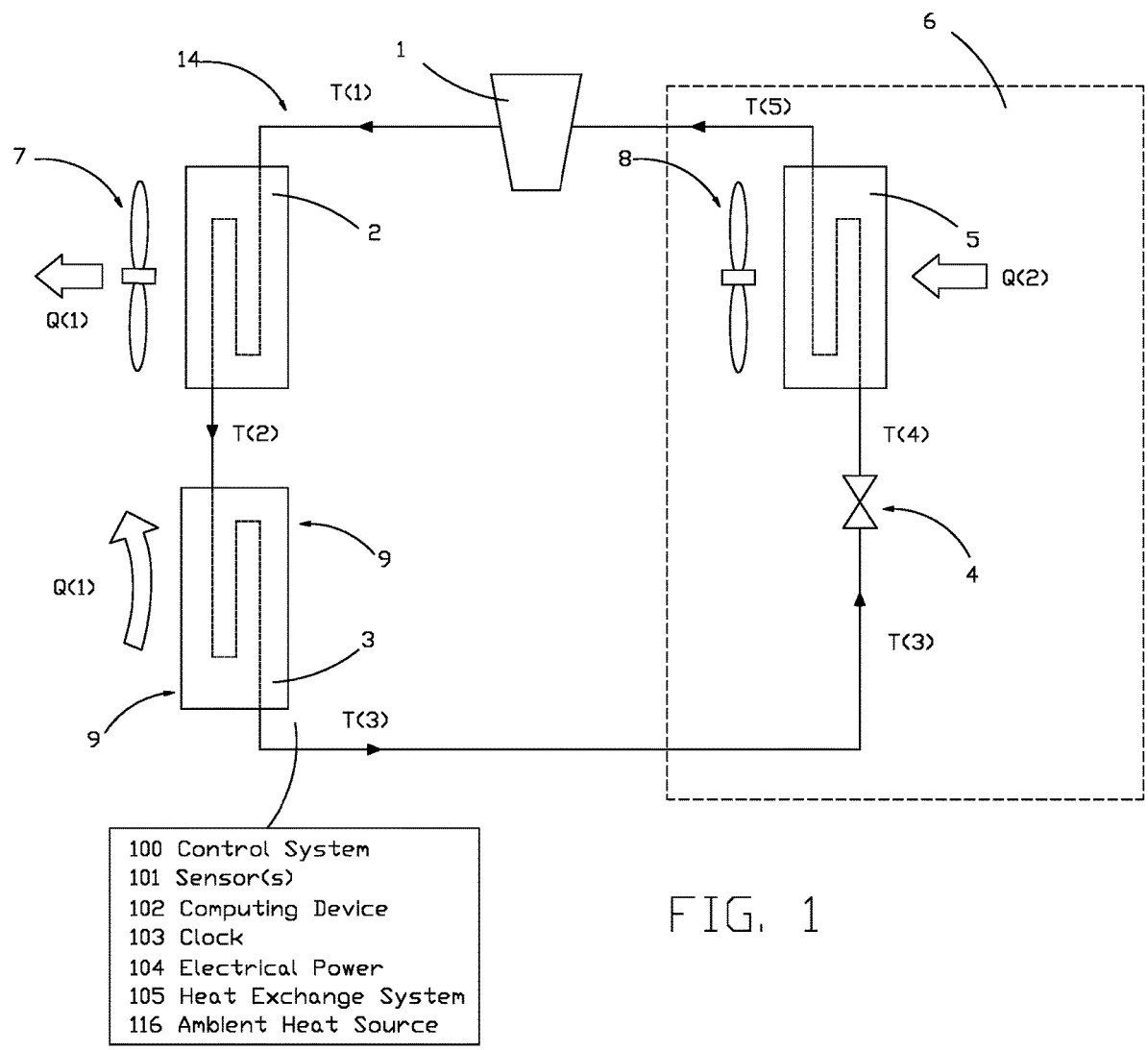
FIG. 1 illustrates a heat pump cycle in cooling mode (air conditioning) in accordance with some embodiments.

1 Pressure increasing device (Compressor, Pump, etc.)
2 Heat Exchanger (Condenser)
3 TES (Thermal Energy Storage) (Comprising Sensible or Latent (PCM) material(s))
4 Pressure reducing device (Throttle, Capillary Tube, Turbine, Expander, etc.)
5 Heat Exchanger (Evaporator)
6 Enclosed Space (Building, Home, Vehicle, etc.)
7 Fan
8 Fan
9 Conductive Surface
10 Air Exit Valve (Damper, Shutters, etc.)
11 Air Inlet Valve (Damper, Shutters, etc.)
12 Fan
13 Fan
14 Refrigerant, Piping, and Fluid Flow
15 Pressure reducing device (Expander, Turbine, etc.)
16 Venturi
17 TES (Thermal Energy Storage)
18 TES (Thermal Energy Storage)
19 Radiative Surface
20 Radiative Surface
21 Electric Generator
22 Electric Motor
23 Electrical Wire or Connection
30 Reversing Valve
31 TES Reversing Valve
32 Valve
33 Pressure reducing device (Throttle, Capillary Tube, Expander, Turbine, etc.)
34 Insulation
35 Valve
36 Valve
40 Regenerator
61 Evaporative Cooler
62 Heat Input (Gas flame, Electrical resistance, etc.)
63 Evaporative Cooler
64 Separating and Conducting Surface
65 Heat Exchanger
71 Compressor Turbine Connector (Shaft)
80 Solar Collector
100 Control System
101 Sensor(s) (Thermometer(s), Humidity Sensor(s), etc.)
102 Computing Device
103 Clock (Time(s))
104 Electrical Power
105 TES Heat Transfer System (Cooling or Heating)
106 Data
107 Network
108 Programming
110 Charge TES? (Determine if TES should be charged)
111 Charge TES
112 Determination Step
115 Radiant Heat Exchanger (Collector or Emitter)
116 Ambient Heat Source
T(1) Temperature
T(2) Temperature
T(3) Temperature
T(4) Temperature
T(5) Temperature
T(6) Temperature
T(7) Temperature Q(1) Heat Energy Out
Q(2) Heat Energy In
Q(3) Heat Energy Out
A(1) Ambient Air In
A(2) Ambient Air Out
A(3) Humid Air

DETAILED DESCRIPTION OF THE EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known and/or common processes, mechanisms, elements, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms may only be used to distinguish one element from another. For example, a first member could be termed a second member, and, similarly, a second member could be termed a first member, without departing from the scope of the present invention.

The terminology, used in the description of the invention herein, is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of stated features, steps, methods, operations, elements, and/or components, but do not preclude the presence or addition of one or more other features, steps, methods, operations, elements, and/or components thereof.

Embodiments of a thermal energy transfer system and/or device(s), and associated processes for using such devices are described. In some embodiments, the invention is a cooler/air conditioner for cooling a building. In some embodiments, the invention is a heater for heating a building. In some embodiments the invention does both depending on need and/or season of the year. In other embodiment It should be understood, however, that some of the embodiments may be applied to other devices, such as, but not limited to, vehicles, storage spaces, etc.

In the examples about to be disclosed, the embodiments are for the use of heating or cooling a space, which is generally the interior of a building. Common to many embodiments are the common elements of a heat pump, such as evaporators, condensers, pumps, and throttles.

The present embodiments are generally for heating or cooling an enclosed space. An example is a building. A building is generally an enclosed space, but it may have open windows and such. Therefore, the term "enclosed space" generally refers to the space that it is desirable to transfer heat energy into or out of, regardless of whether it is completely enclosed or not. Another example is a transportation vehicle, such as a truck, automobile, or boat. Another example is a refrigerator, or cooled storage area, which may be within another enclosed space, such as a building. Some of the present embodiments may be cascaded.

The terms "ambient source", "ambient heat source", "ambient environment", or "ambient air" will generally refer to the ambient air or environmental conditions outside of the enclosed space. For example, the ambient heat source of the air to air heat pump systems and devices of the present embodiments is generally the outside air. But due to the fact that the present embodiments can be cascaded, it may be the enclosed space of an outer level heat pump system. Heat energy can be transferred to or from the ambient heat source.

A heat pump can be considered a device. However, it is also a system of devices. Examples of the devices comprise pressure increasing and decreasing devices, and heat exchangers, such as evaporators and condensers. These individual devices are connected by a fluid that flows though and between them transferring heat energy, which comprises the system.

Also common to many embodiments is a thermal energy storage (TES) device. It is comprised of thermal mass. (The term 'TES' refers to Thermal Energy Storage, as is common in the art.) The TES comprises phase change materials (PCM) in some embodiments. (The term 'PCM' refers to Phase Change Material, and is also a common term in the art.) In other embodiments, a TES comprises a mass of material that does not phase change in a normal operating range. Examples of a non-PCM TES comprise water, rock, and earth, but may be other common materials. Water and earth are common heat storage materials used in ground sourced heat pump systems that utilize seasonal heat storage.

In most of the present embodiments, the TES storage is generally for the use of storing heat, or cold, for less than 24 hours. The TES of the present embodiments are generally exclusive from storing heat, or cold, seasonally. To provide a measure of difference between a TES designed for daily thermal variations and TES, such as ground sources, designed for seasonal use, a daily TES will be defined as storing less than 10 days' worth of heat (cool or hot) storage for its application. The reason for why this definition is not 1 day is that it may be beneficial for a TES to store heat energy from a warm daily cycle over a cool period of a few days for heating, or vice versa for cooling, even if its primary function is to store heat for less than one day. This definition differentiates this type of TES storage from common seasonal storage.

In an aspect of the invention, magnetic (magnetocaloric) effect can be used to cool or heat. The present embodiments generally relate to compression vapor cycles, but they can be adapted to cooling systems that utilize the magnetic effect.

In an aspect of the invention, heat pumps can be used to exchange heat energy between the ambient environment and an enclosed space, and/or a TES. Exchanging heat energy may also be referred to as moving heat or heat energy, or pumping heat.

For this disclosure, a first heat pump is defined as the main heat pump that exchanges heat energy between the ambient environment and an enclosed space. This may also be referred to as the "first" or "main" heat pump. A second heat pump is defined as the heat pump that exchanges heat energy between the ambient environment and one or more TESes. This is just for the purpose of avoiding confusion.

In an aspect of the invention and in an embodiment, the "first" or "main" heat pump uses a fluid 14 to transfer heat energy. This is generally refrigerant, as Rankine cycles are generally more efficient than Brayton cycles. But the fluid may be any common fluid for transferring heat energy, such as air or helium. The invention is not limited to one fluid, but individual embodiments may be, and may also be exclusive to some alternative fluids, such as water. In an aspect of the invention, absorption cooling using desiccants are common. Individual embodiments may also be exclusive from fluids comprising desiccants and absorption cycles.

In an aspect of the invention, the fluid generally flows in tubing, piping, or ducting, which may also be referred to as 'lines'. For example, the fluid may be refrigerant flowing in refrigerant lines. Refrigerant and refrigerant lines are common elements of some heat pump systems.

In an aspect of the invention, regenerators are common elements in some heat pump systems. The embodiments of this disclosure are compatible with heat pumps utilizing regenerators.

Attention is now directed towards embodiments of the device.

FIG. 1 illustrates a heat pump cycle in cooling mode (air conditioning). This embodiment comprises the common elements of a pump 1, a condenser 2, a throttle 4, an evaporator 5, and a loop of refrigerant lines comprising some fluid 14 that is moved through the other elements. These elements comprising a cycle. These are not shown in detail as these are widely used and common elements in air conditioner and heat pump systems.

Figure 18:
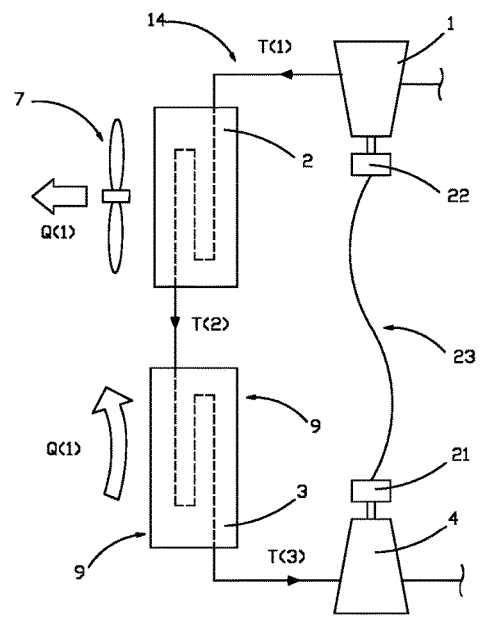
FIG. 18 illustrates a heat pump cycle with means to connect work output from a pressure reducing device to work input to a pressure increasing device.

In an aspect of the invention, the pump may comprise a compressor, or any pressure increasing device. In another aspect of the invention, the throttle may comprise a capillary tube, an expander, expansion valve, turbine, or any pressure reducing device. Also, the expander may be linked to the compressor or pump. The link can be physical, such as a drive shaft or axel 71 (FIG. 7, 11), or electrical. In an embodiment, as illustrated in FIG. 18, the compressor 1 comprises an electric motor 22 that turns electricity into a pressure increase in a working fluid. And the expander/turbine can comprise an electric generator 21 that turns a pressure difference into electricity that partially drives the electric motor. In this way, the compressor and expander can be in different places in a building or enclosed space with just one or more electric wires 23 needed to connect the two. The use of this particular embodiment of the compressor and expander being connected through electrical means is for cooling the enclosed space. However, it may also be used for heating the enclosed space, or for cooling or heating one or more TESes. In an aspect of the invention, the expander can generate electricity for other uses, which can include putting electricity back in the electrical grid.

FIG. 1 also illustrates a common vapor-compression based air conditioning cycle, but with the addition of Thermal Energy Storage (TES) 3. However, TES may be added to air conditioning systems utilizing other cycles. For example, a reverse Brayton cycle may be used. The difference with a reverse Brayton cycle is that the working fluid/gas 14, which could be a refrigerant, does not undergo a phase change operation. Vapor-compression air conditioners generally utilize the reversed Rankine cycle which uses a phase change operation.

Further, the vapor-compression cycle shown may be for the use of cooling air. But it may also be for the use of cooling water in a chiller. Cooling water in a chiller is common practice in large buildings. The cool water is then distributed through the building requiring small diameter pipes relative the to large ducting that would be required to move air through a building. Easier to insulate too. Thus in FIG. 1, the heat exchanger 5 can be viewed as exchanging heat with an enclosed space, which may be a chiller that then distributes cool or heat energy to another enclosed space, which may be a building. Certain embodiments of the invention may also be exclusive from a chiller.

In an aspect of the invention, residential homes generally do not use chillers. However, an embodiment that transfers heat energy (hot or cold) from a heat pump to a chiller (or tank of liquid) and then distributes and transfers the heat energy (cold or hot) to the buildings air ducting (or directly to registers) can reduce the total amount of refrigerant needed. What can be eliminated is the refrigerant in the piping between the outside heat exchanger and the inside heat exchanger. Considering that many refrigerants have detrimental environmental effects, it may be desirable to use a chiller or second fluid flow to transfer heat energy into or out of a house or building to reduce the amount of refrigerant. However, pumping water in piping circuits causes friction, which works against the efficiency of the system in cooling applications, and should be taken into consideration. For this reason, it is often preferable to place a TES in the main refrigerant loop exclusive from being in a water or chiller loop.

In FIG. 1 it can be seen that the TES is placed within the circular heat transfer fluid flow and is added in a novel position immediately downstream of the condenser, relative to the flow of refrigerant or fluid. The condenser is receiving pressurized refrigerant or gas from the pressure increasing device (pump in this embodiment) first, and then it flows into the TES. The TES is also between the condenser and the pressure reducing device (throttle in this example). The condenser operates normally, wherein the refrigerant (for vapor-compression cycles) condenses due to the increase in pressure from the pump. The latent heat of condensing is then conducted out to the outside ambient air. The refrigerant temperature exiting the condenser is by theory equal to the outside air temperature upon exit T(2). But in practice it is somewhat greater than the outside air temperature.

The terms "downstream" and "upstream" generally have their common meanings and refer to the flow of the fluid that transfers heat through a heat pump system. For example, a TES being "downstream" of a device means that the heat transfer fluid first flows through the device and then flows into the TES. In an aspect of the embodiment of FIG. 1, the TES is immediately downstream of the condenser, but the embodiment and invention is not necessarily limited to this. Another device, such as a temperature sensor, or an evaporative cooler could be placed between the TES and the condenser. Considering that any element could be considered downstream of any other element in a cycle that moves fluid through a loop, the terms "downstream" and "upstream" will implicitly imply that a first element described as "upstream" of a second element will not be in between the second element and a third element, when the third element is described as "downstream" of the second element, and vice versa.

Further, the term "immediately" when used in reference to one device being "upstream" or "downstream" of another device does not exclude other devices in between that do not significantly change the heat transfer process by being in between the two stated devices. For example, a temperature sensor or pressure sensor being placed between pressure and temperature changing devices would not significantly change the heat transfer process. By contrast, they would be for the indirect use of measurement, and not for directly affecting the heat transfer process. These devices could be between two pressure and/or temperature changing devices, even though one is described as "immediately' downstream or upstream of the other device. This also applies when the "immediately" prefix term is not present.

In an aspect of the invention, any device may be comprised of a plurality of devices with the same function. For example, a pump could be two pumps in series or parallel that work to move the fluid.

In FIG. 1, the evaporator 5 is downstream of the throttle 4, which is downstream of the TES 3, which is downstream of the condenser 2, which is downstream of the pump 1. In FIG. 1, heat energy Q(1) is expelled when the pump increases the pressure of the fluid in the condenser, cooling the fluid. The fluid then flows into the TES. The TES may then cool the refrigerant farther, which is to say to a lower temperature than the condenser cooled the fluid. Assuming the TES is cooler than the outside air, the flowing refrigerant will be further cooled from T(2) on entering the TES to T(3) upon exiting the TES. If the refrigerant is further cooled by the TES, the temperature will also be cooler at T(4) as throttling (pressure reducing) devices are generally adiabatic. This then lowers the temperature in the evaporator which causes the evaporator to absorb and remove more heat per mass flow of refrigerant fluid. A lower temperature in the evaporator will absorb more heat for a given length of time for which the system is run. To provide a given amount of heat transfer out of the enclosed space, an otherwise identical system with TES can be run for a shorter interval of time compared to a system without TES.

Thus, the TES adds efficiency to the cycle, but only if it is cooler than the outside air. To cool the TES, outside air is utilized substantially at night and early morning when the outside temperatures are at their lowest. Cooling the TES can be accomplished through conduction, convection, evaporation, emission of radiant energy, a heat pump, or other means. In this first embodiment and example, the TES is cooled by taking advantage of the normal variation between nighttime and daytime temperatures, which is the daily temperature cycle. The TES is cooled at night. Methods and embodiments for cooling the TES will be detailed further below.

Provided the TES is cooler than the incoming heat transfer fluid, the TES will cool the fluid farther. In an aspect of the invention, the phase change of the refrigerant flowing through the refrigerant lines may be deferred to occur in full or in part in the TES, instead of substantially occurring in the condenser, by lowering the pressure differential the pump (or pressure increasing device) provides. This is another method by which efficiency can be increased in the system, as pumping the fluid to a lower pressure differential lowers work input to the system. A system designer can choose between this method and running the system for less time, or choose a combination between the two methods, as they may be combined.

An example is now provided to illustrate the operation of the present embodiment. Let's assume that the desired internal temperature of a building is to be 75° F. degrees and the overnight low temperature in this locale is also 75° F. Let's also assume that the outside ambient temperature is 100° F. Let's also assume that the temperature leaving the pump and entering the condenser at T(1) is 125°. Then by theory, the temperature exiting the condenser and entering the TES will drop to 25° F. at T(2). Provided the TES was cooled overnight to the same inside temperature of 75° the refrigerant will then by theory be cooled to this temperature at T(3). The TES will then have cooled the refrigerant by the same 25° differential as did the condenser.

In this example, the TES and the evaporator both cooled the refrigerant by the same amount, and thus each contributed 50% of the heat transfer out of the fluid flow. Thus, in this example, the amount of TES (thermal energy storage) required to cool the refrigerant is significantly reduced compared to placing a TES within the condenser, or before the condenser, or in place of the condenser, as the temperature leaving the condenser cannot be below the outside temperature of 100°. In this example, the TES of this embodiment could be 50% of the size of a TES that would have to absorb 100% of heat energy.

In an aspect of the invention, a lower current outside temperate would cause the TES to contribute less to the cooling of the refrigerant, and vice versa. However, a TES that is cooled to a lower temperature would contribute more. As the majority of energy is used during times of higher outside temperature and ambient conditions, and/or the system runs for more time when the temperature is higher, the TES will significantly contribute. As the reader can deduce, placing a TES in this position to cool the refrigerant would significantly reduce the amount of TES material required to cool the building compared with placing TES is some other locations within the heat pump system, which is an advantage of the invention.

In an aspect of many of the embodiments of the invention, the one or more TESes placed within the main loop of fluid flow that transfers heat energy between the individual devices of the main heat pump system are for the use of transferring a portion of the heat energy that is removed from an enclosed space (or moved into, for heating embodiments), as shown in the example above. For the use of defining the invention in claims, the term "portion" will be defined as less than 90%. (This would be "<100%" by theory, but 10% will account for some incidental heat transfer in real processes.) In general operation, the TES of the present embodiment provides only a portion of the heat transfer to the ambient outside environment, with the condenser providing the rest. This particular embodiment is exclusive from providing all of the heat transfer from or to the heat transferring fluid in general operation, as are many of the embodiment disclosed below.

In an aspect of many of the embodiments of the invention, one or more TESes are downstream of a heat exchanging device. Both the TES and the heat exchanging device lower the temperature of the heat exchanging fluid (or raise it in the heating applications, as describe below). Thus, heat energy is moved in the same direction in both devices. The term "direction" here means that heat energy is being transferred out of the fluid by both of these devices, as in the embodiment of FIG. 1. In the heating embodiments below, these elements may both transfer heat into the fluid in the same direction, though this direction is the opposite direction of the cooling embodiment of FIG. 1.

In an aspect of the invention, TES may be placed in the air ducting of the air conditioning system, or within the building itself. The air ducting of common air conditioners is commonly placed inside the building. So, placing TES within the air ducting requires changing the ducting within the building, which can be costly and difficult. Further, if the TES is inside the building, some means need to be provided to cool the TES with cool nighttime air, which adds to the cost and complexity of the system.

Further, placing TES within the air ducting on the input side of the evaporator will cool the air entering the evaporator, but that lowers the rate of heat exchange in the evaporator as the air temperature difference between the incoming air and the refrigerant is reduced, which is undesirable. A larger evaporator with more surface area would be needed.

For at least some of these reasons, the at least one TES element of this embodiment is exclusive from being placed within the air ducting of the building, and is exclusive from being part of the thermal mass of the building. This does not mean that other TES cannot be added to other parts of the system, it just defines this particular TES element.

In an aspect of the present embodiment, the TES of the present embodiment is for the use of reducing the temperature of the heat exchanging fluid from the temperature at which the fluid leaves the condenser and flows into the pressure reducing device, which then lowers the temperature at the evaporator. In this particular embodiment, and many of the present embodiments, the TES is not for the use of providing hot water.

In an aspect of the invention, TES materials are common. It is also common for one or more Phase Change Materials (PCM) to be used in TES (thermal energy storage) systems. As is well known, phase change materials can provide much greater thermal energy storage for a given mass and can provide heat transfer at a consistent temperature during the phase change.

In this example, the TES comprises a phase change material, which is an alternative element (though not a limitation of the embodiment of FIG. 1). In this example the phase change would occur at 75°. But any suitable temperature will suffice. If the temperature of the phase change of a PCM is sufficiently above the nighttime low, the PCM can be cooled passively below its phase change temperature. During daytime operation, the PCM would provide sensible heat storage until its phase change temperature is reached, then it would provide latent heat storage through the phase change, then sensible heat storage above the phase change temperature.

If the PCM's phase change temperature is below the nighttime low temperature, then it could only provide sensible heat storage. However, if means are provided to cool the PCM to below or at the temperature of the phase change, then the PCM can phase change and provide latent heat storage. A list of alternative means for providing cooling below the phase change temperature to the PCM to "charge" the device comprises, but not limited to, evaporative cooling, a reverse Rankine cycle, vapor compression, a reverse Brayton cycle, a reverse Stirling cycle, magnetic cooling, thermoelectric, absorption, or any other common form of cooling. Some embodiments may exclude some of these alternatives. Also, two or more heat transfer cycles or other means to transfer heat can be combined, either in serial or parallel. More details will be given below.

In an aspect of the invention, the PCM is cooled with cool nighttime air. This cooling may comprise any of the disclosed methods of this disclosure. It may also comprise conduction, and convection, provided the phase change temperature is higher than or equal to the nighttime low. More details for cooling the PCM will be given below.

In an aspect of the invention, heat pump cycles operate more efficiently at low temperature differentials. The COP (Coefficient of Performance) formula for an ideal heat pump providing cooling is: COP=T(cool)/(T(hot)−T(cool)) (where T is temperature in absolute degrees). As one can deduce, if T(hot) is close to T(cool) then the denominator is very small and the COP is very high—which means greater efficiency. For this reason, if a PCM needs to be cooled at night from a low nighttime temperature to the phase change temperature, it can be done so very efficiently provided the two temperatures are close. If the temperatures are the same, the COP goes to infinity. In practice, however, friction and other irreversibilities would prevent this. But it would still be very efficient.

In an aspect of the invention, the overnight low temperature varies. So even if a phase change based PCM is not cooled enough to complete a full phase change, it may still provide sensible (cool) heat storage. This then would be exhausted when the temperature of the PCM reaches the temperature of the refrigerant entering the TES. At this time, the TES provides no advantage, but it would also not raise the temperature.

In an aspect of the invention, the size of the TES, and the materials of the TES, depend on the climatic conditions into which it is installed. It is important to note that the size and materials of the TES have not only cost, but also associated energy and possible global warming impact in their production. So, the determination of the proper size, design, and material is determined by many factors. A TES that does not quite provide enough thermal storage for the hottest days (or coolest for the heater embodiments discussed below) can still be desirable and preferable as it can provide a low overall and acceptable cost, and overall energy balance.

Further in this first example, the TES element lowers the effective T(hot) for the vapor-compression cycle of this first embodiment, which improves the COP.

Figure 19:
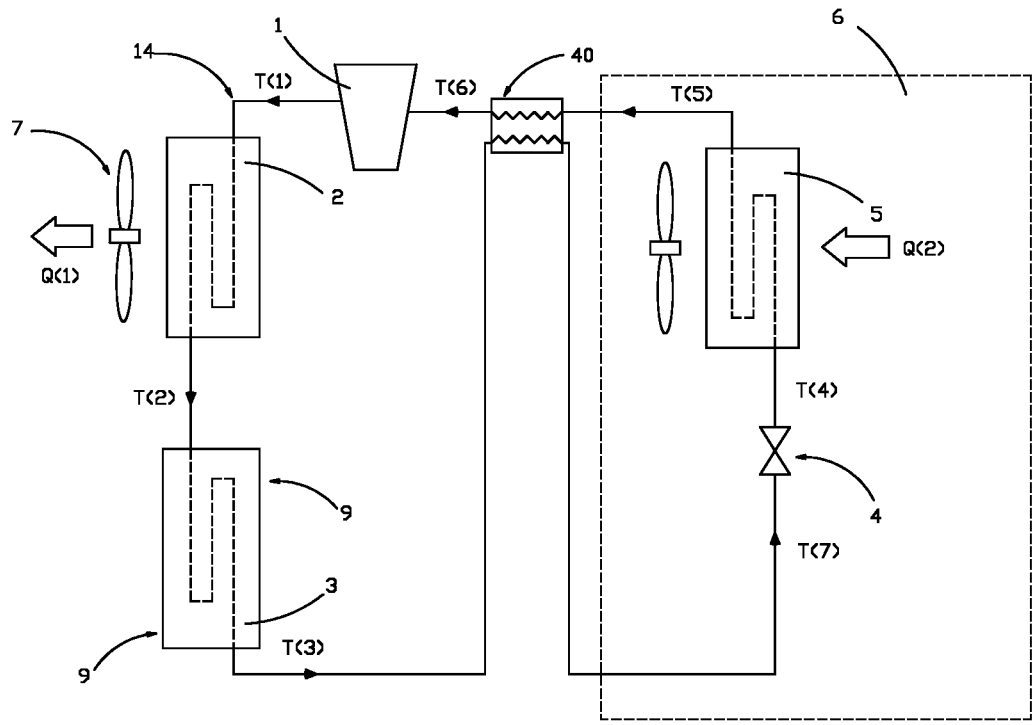
FIG. 19 illustrates a heat pump cycle comprising a regenerator in accordance with some embodiments.

FIG. 19 illustrates an embodiment for the use of cooling that includes a regenerator 40. Regenerators are common, and in this embodiment it lowers the temperature at T(7), which in turn lowers the temperature at T(4). Compared to the embodiment of FIG. 1, the TES 3 is now placed between the condenser 2 and the regenerator 40, and the TES is now upstream of the regenerator. In an aspect of the invention, one or more regenerators can be added to other embodiments of the invention without departing from the scope of the invention. A regenerator is an option that is not shown in some of the other drawings as it would needlessly clutter the drawings.

Methods and Embodiments for Cooling or Heating the TES

The thermal energy storage (TES) of some embodiments of the present invention is cooled during the cooler parts of the daily temperature cycle for the present cooling methods and embodiments. Similarly, the TES is heated during the warmer parts of the daily temperature cycle for the present heating methods and embodiments. This comprises charging the TES at the most favorable times of the daily temperature cycle. Charging the TES may be accomplished with the following list of alternative methods: conduction and/or convection, heat pump cycles, absorption/adsorption cycles, evaporation, magnetic or magnetocaloric effect, thermoelectric (Seebeck effect), heating with fossil fuels, or heating with left over heat (such as combined heat and power—CHP), or any common method of transferring heat energy. These methods may be combined.

In an aspect of the invention, the heat exchange or transfer system 105 cools or heats the TES. Heat energy is transferred out of or into the TES to charge the TES for use in the next warm or cool cycle of the day.

If heat energy is transferred to or from the TES using conduction and/or convection from the material of the TES to the outside environment, this will happen naturally and passively. This is desirable at times when the TES is being charged, such as nighttime or early morning for cooling applications. But it is undesirable in many embodiments for the TES to warm up from heat being transferred into the TES during the heat of day for cooling embodiments (and vice versa for heating embodiments). So, the TES would benefit from being insulated with insulation 34 to prevent significant heat transfer at the times of day or night that inhibit its operation. Thus, the TES can benefit from incorporating means of allowing significant conduction and transfer of heat at some times of the day, and insulating the thermal mass at other times.

However, a TES would still be beneficial if it is not insulated. Provided there is a sufficient amount of thermal mass, the change in temperature of the mass would both lag the change in temperature of the outside air. And the change in temperature would not vary as much as the change in outside air. In fact, if the mass were infinite in quantity, the temperature would not change. So, there would still be a temperature difference with which the TES would transfer heat energy beneficially. In an embodiment, the TES is not substantially insulated.

However, it is preferable to insulate the TES at times when the heat transfer in or out of it is to the detriment of the operating efficiency of the whole heating and/or cooling system. In an embodiment, the TES comprises insulation 34 (FIGS. 3-12, 15). In an embodiment, the TES comprises a control system 100 that comprises one or more of the following elements: sensor(s) 101, time sensing means (clock) 102, calendar, and computing device 102. Sensors 101 may comprise one or more of the following: temperature sensors, pressure sensors, humidity sensors, light sensors, and other common sensors. A computing device may comprise common computing elements as well as means to receive a signal or data from an outside source for the use of changing the state of heat transfer with the outside environment. An example of outside data would be the availability or rates of water. Another example would be electricity availability or electrical rates. The use of the TES control system is to control the heat transfer into or out of the TES. The computing device and/or control system may communicate across a network 107, which may be the internet, to send or receive data 106 to or from an outside source. In an aspect, data may be data that flows across a network, or is data that resides in the computing device and/or control system. Computing systems, data, and networks are common elements.

In an aspect of the invention, the control system can be within or adjacent to the TES, or it can be incorporated into the control system for the whole heating and cooling system. It is within the skill of a person skilled in the art to incorporate a control system.

In an aspect of the invention, a control system comprising electronics is not actually necessary to vary the heat transfer and effective insulation. It is possible, for example, to use the linear expansion or contraction of materials to open or close shutters, dampers, valves, thermal contact points, or other means to modify conductivity.

In embodiments with control systems, the control system controls the heat transfer into and/or out of the TES. The control system uses one or more. In an embodiment, one opening is higher than the other. In this case, natural convection will assist. In an embodiment, ductwork is used to route the flow of air used for cooling or heating. In an aspect on the invention, an intermediary material may be used to pass heat energy from the outside ambient environment to the TES material. Further, conductive material may extend into the TES material.

In an embodiment, one or more fans 12, 13 (FIG. 3, 4, 8) are added to the air path through, adjacent to, entering, or exiting the TES. In an embodiment, the air path through the TES enclosure comprises one or more venturis 16 to cool the air passing the conductive surfaces of the TES. In an embodiment, one or more fans blows air out of the TES enclosure. In an embodiment, one or more fans blows air into the TES enclosure. In an embodiment, one or more fans blow on the outside of the TES. In an embodiment, at least one fan blows air in, and at least one fan blows air out on the TES enclosure. In an aspect of the invention, the TES and control and heat exchange systems may be incorporated into other enclosures, such as in the same box as the condenser 2/evaporator 5.

Figure 7:
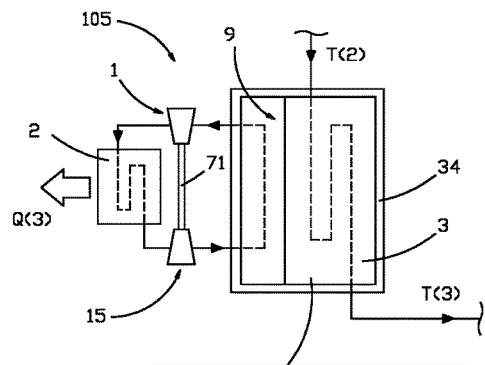
FIG. 7 illustrates a TES with heat exchange system in accordance with some embodiments.

In an embodiment, a control system of the TES directs active measures or methods of cooling the TES. Active measures and/or methods comprise one or more of heat pumps, evaporative methods, absorption/adsorption cycles, magnetic or magnetocaloric effect, thermoelectric (Seebeck effect), or any common method of transferring heat energy. FIG. 7 illustrates an embodiment comprising a common gas refrigeration cycle, which utilizes air in a reverse Brayton cycle. An active measure, method, or device turns a source of energy into heat or cool energy. This is different from using heat energy from the daily temperature cycle. For example, conducting and/or convecting heat energy from ambient air into or out of a device, such as a TES, are examples of using 'free' energy, which is no cost energy.

In an aspect of the invention, gas refrigeration cycles can be open or closed. In an embodiment the TES Heat Transfer System 105 is open. In another embodiment, it is closed.

Figure 5:
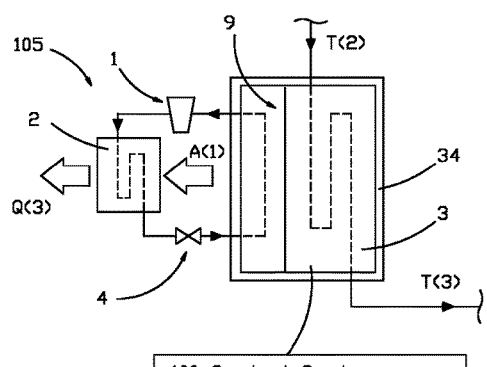
FIG. 5 illustrates a Thermal Energy Storage (TES) with heat exchange system in accordance with some embodiments.

In an embodiment, as illustrated in FIG. 5, a vapor compression cycle is used to cool the TES. This embodiment uses a throttle 4, but can be any common pressure reducing device. This cycle utilizes refrigerant in a reverse Rankine cycle. This cycle is generally used for cooling and is favored over gas refrigeration cycles, such as in FIG. 7, as vapor compression cycles have higher COP's and, thus, greater efficiencies. However, using active measures to cool the TES is only necessary when the outside temperature is not cool enough over the nighttime hours to fully cool and charge the TES. Further, the temperature differentials are generally quite low at the general times of use. Both of these cycles have COP's that go to infinity (by theory) when the outside ambient air temperature is the same as the temperature of the TES.

In an aspect heat transfer cycles, heat transfer cycles become heat engines if the TES temperature is above the outside air temperature—in theory. So, for the cooling embodiments the heat cycle would not require any work input in this case. It would have work output. However, in a real cycle with friction and irreversibilities, it might take some work input.

In an aspect of the invention, a TES is cooled in the cooler nighttime air in the cooling embodiments, and it is heated in the warmer day in the heating embodiments. The temperature differentials during the times of charging are generally smaller than the temperature differential in which heating and cooling cycles run. Friction and other irreversibilities may be more important at small temperature differentials. Thus, a gas cycle using air may be more competitive with a vapor compression cycle, and should be considered.

FIG. 7. Illustrates a TES cooling system 105 and embodiment comprising a gas refrigeration cycle using a compressor 1 and a turbine 15. In this case, the working fluid is a refrigerant, but may be any suitable gas or fluid, such as air.

Provided a refrigerant is used, the compressor 1 and turbine 15 may drive a phase change cycle. Provided air, or another gas is used, the cycle will generally not comprise a phase change. If a phase change occurs, it is a vapor compression cycle. Otherwise, it is gas refrigeration (or heating) cycle.

In the embodiment shown in FIG. 7, a shaft 71 is depicted. But the means to connect a pressure increasing device to a pressure decreasing device, such as a compressor and turbine, or two fans, can be means other than a shaft. For example, and in an embodiment of the invention, the turbine in these embodiments may drive an electrical generator which in turn is connected electrically to an electrical motor of the turbine, as is shown and exemplified in FIG. 18.

In an aspect of the embodiment of FIG. 7, and other embodiments utilizing a gas refrigeration cycle or gas heating cycle using air, the cycle may be an open cycle. Wherein the heat exchanger (2 in FIG. 7) that exchanges heat with the outside air is eliminated. Elimination of heat exchanger 2 in FIG. 11. would be desirable in climates where the outside temperature is cold enough to cause frosting problems in the outside heat exchanger of these embodiments that provide heat energy to the TES.

Figure 8:
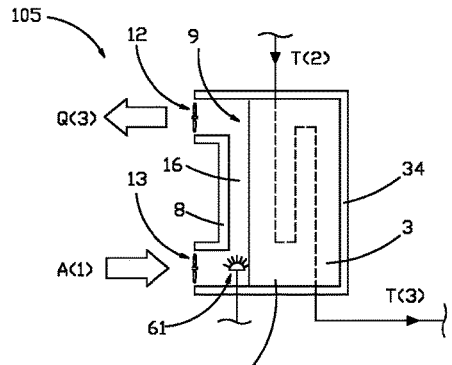
FIG. 8 illustrates a TES with heat exchange system in accordance with some embodiments.
Figure 9:
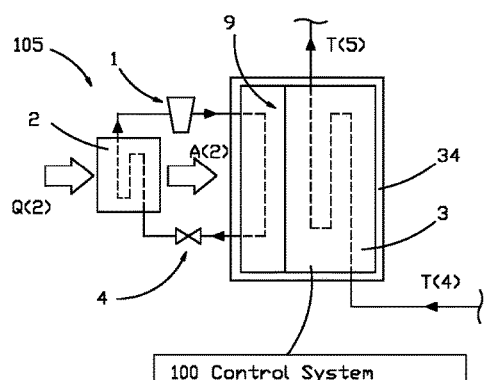
FIG. 9 illustrates a TES with heat exchange system in accordance with some embodiments.
Figure 10:
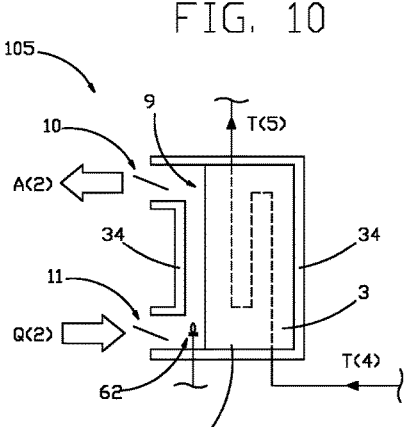
FIG. 10 illustrates a TES with heat exchange system in accordance with some embodiments.
Figure 11:
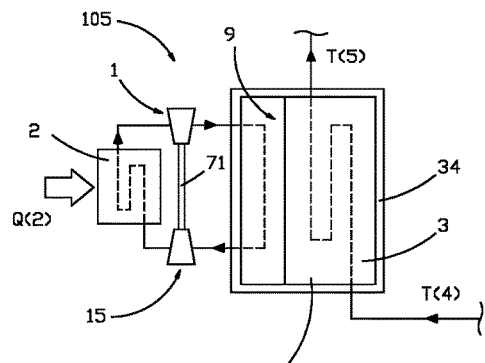
FIG. 11 illustrates a TES with heat exchange system in accordance with some embodiments.
Figure 12:
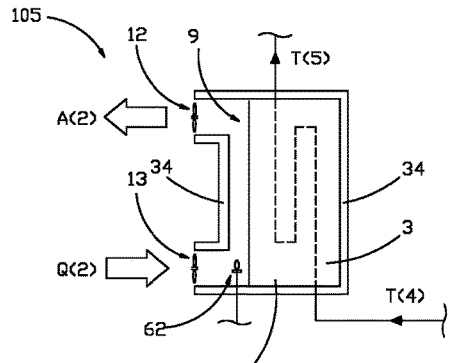
FIG. 12 illustrates a TES with heat exchange system in accordance with some embodiments.

FIG. 8 Illustrates an embodiment using one or more fans 12 & 13 to move outside air across one or more conductive surfaces 9 of the TES to facilitate heat transfer. Provided the fans work to lower the pressure of the air, this comprises a gas refrigeration cycle. Provided the fans work to increase the pressure of air, this comprises a gas heating cycle, as illustrated in FIG. 12.

Figure 4:
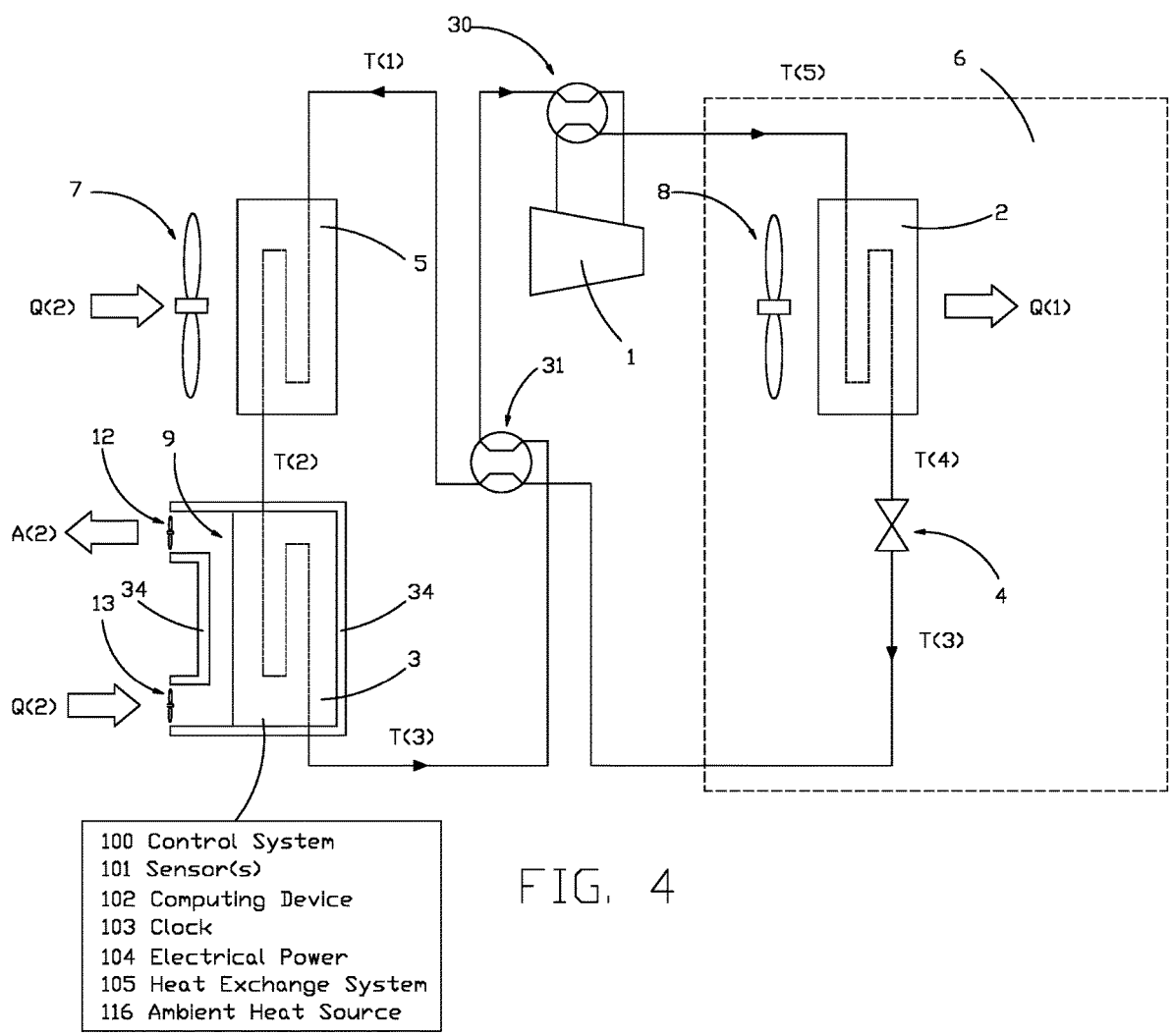
FIG. 4 illustrates a heat pump cycle with reversable fluid flow in heating mode in accordance with some embodiments.

FIGS. 9-12 illustrate the same cycles as FIGS. 5-8, but they are for the use of heating instead of cooling. The flow of refrigerant in these embodiments is reversed compared to the flows depicted in FIGS. 5-8. Thus, they heat the TES instead of cooling the TES. The refrigerant 14 enters the TES 3 at temperature T(4) and leaves at T(5). The four embodiments in these figures also represent embodiments of the TES 3 of FIG. 4. In the case of FIG. 4, T(5) in FIGS. 9-12 represent T(3) in FIG. 4, and likewise T(4) represents T(2). In an aspect of these figures, embodiments may comprise a plurality of cooling devices, or parts, that comprise the same function in place of one, such as multiple fans on multiple sides of a TES. One device working on one side of a TES is shown for clarity in the drawings.

Figure 13:
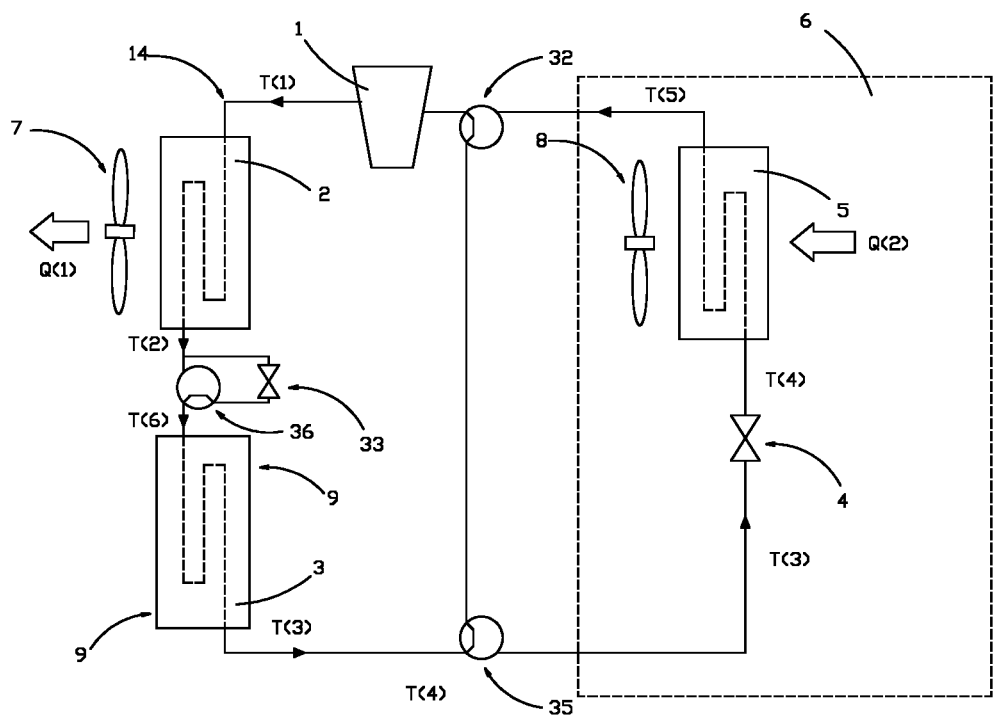
FIG. 13 illustrates a heat pump cycle with TES with heat exchange system in accordance with some embodiments.
Figure 14:
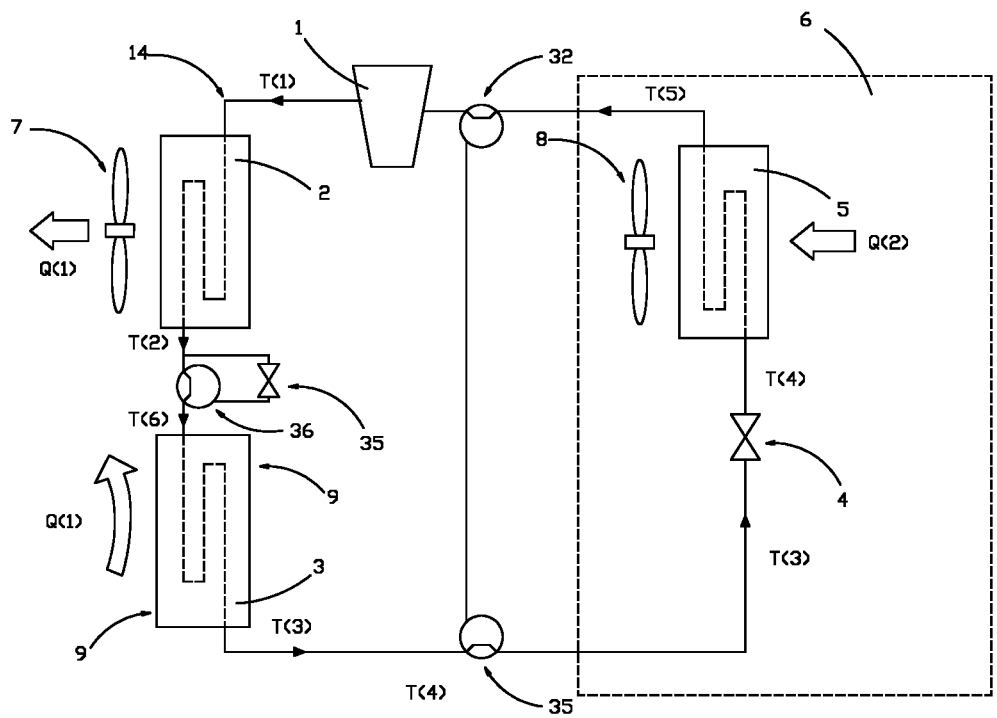
FIG. 14 illustrates a heat pump cycle with TES with heat exchange system in accordance with some embodiments.

In an aspect of some embodiments of the invention, a TES cooling system can be incorporated into the main heat pump cooling system. Likewise, a TES heating system can be incorporated into the main heat pump heating system. FIGS. 13 & 14 illustrate an embodiment that further comprises three valves 32, 35, and 36. In FIG. 13, Valves 32 and 35 redirect the refrigerant to not flow through the evaporator 5, but to redirect the refrigerant flow to the pressure changing device 1, such as a pump, directly from the TES 3. Valve 36 redirects the flow of refrigerant to now flow through a pressure reducing device 33, such as a throttle. In this embodiment the cooling system now cools the TES.

In an aspect of the illustration, valve 36 looks like it is between the TES and the throttle, but a person skilled in the art understands that it is any valving that closes the direct path between the TES and the heat exchanger (condenser 2 in the cooling embodiment) and routs the refrigerant though the pressure reducing device 33. Also, the pressure reducing device does not necessarily have to be closed off when the valves are in the position shown in FIG. 14, as a parallel arraignment of the pressure reducing device and the direct flow pipe will not substantially result in more pressure reduction than the direct flow pipe provides.

FIG. 14 illustrates the same embodiment, but with the valves switched so the heat pump now cools the enclosed space, as it does in FIG. 1. In an aspect of the embodiment, a person skilled in the art understands that if the direction of pressure increase at the pump is reversed, the embodiment of FIG. 13 now heats the TES. Likewise, when the valves are in the position of FIG. 14, the heat pump heats the enclosed space. Also, the three valves and extra pressure reducing device of this embodiment can be added to the reversable heat pumps of the embodiment of FIGS. 3 and 4. Further, the method shown in FIG. 13 of using pump 1, throttle 4, heat exchanger 2, and refrigerant of the main heat pump to cool/heat the TES may be combined with the other methods and embodiments of this disclosure to cool or heat the TES for at least the use of charging the TES.

Control systems are common (however, some methods and embodiments of the control system of the present invention are novel). The switching of the valves between the positions shown in FIG. 13 to the positions shown in FIG. 14, or vice versa, are controlled by a control system. Likewise, powering the pressure increasing device (pump) is controlled by a control system. Any common method of switching the valves may be used, such as manual or electric.

In a method of the present embodiments, a control system 100 determines when to charge the TES. In a method, the control system determines that a TES comprising a phase change material will not sufficiently change phase due to the ambient temperature not being sufficiently low or high enough to complete the phase change. Upon this determination, the control system switches valves of the embodiment and powers the pressure increasing device to direct the system to charge the TES and complete the phase change. In an aspect of the embodiment of FIGS. 13 and 14, other methods of controlling and cooling or heating the TES described else ware in the disclosure, or any common method, may be utilized.

Utilizing Evaporation of Water

Figure 6:
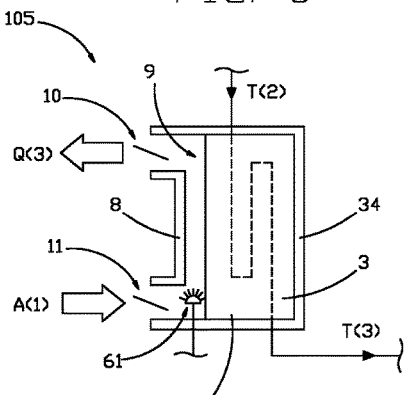
FIG. 6 illustrates a TES with heat exchange system in accordance with some embodiments.
Figure 15:
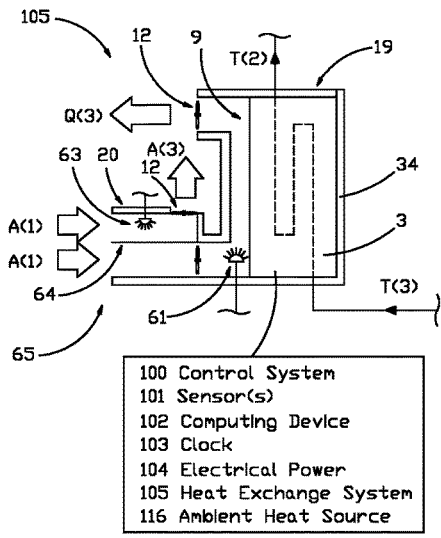
FIG. 15 illustrates a TES with heat exchange system in accordance with some embodiments.

In an aspect of the cooling embodiments and methods of the invention, water, or any other suitable liquid, may be used to cool the TES (thermal energy storage) through evaporation. FIGS. 6, 8, & 15 show embodiments comprising at least one nozzle that sprays, inputs, mists, or places water into the air flow, which comprises an evaporative cooler. Nozzles are a common element, and adding water vapor to an airflow is common. However, the use of evaporation to cool a TES is not common.

In an aspect of some embodiments of the invention, the TES needs additional cooling when the outside nighttime temperature is not cool enough to fully charge the TES. In some climates, additional cooling is not needed. However, in many climates there are nights when the coolest temperatures are not quite cool enough. In a method of embodiments that comprise evaporative cooling, water is sprayed, input, or misted into the airstream of the air flow to cool it. In turn the evaporatively cooled airflow cools the TES in turn through some conductive surface(s) 9. The water may also be sprayed, coated, or misted directly onto a conductive surface, or a combination of both methods.

In a method of these embodiments, a control system 100 determines when to utilize evaporative cooling of the TES and sprays, inputs, or mists water to cool the TES. The determination may be based on one or more of the following list of alternative elements: a determined low temperature of a night, the relative humidity, the availability and/or cost of water, the determined temperature of the cooled air, or the cooling capacity of the water, the capacity of the TES to provide heat exchange during the completion of a cycle (absorbing heat the next day), cost or availability of electricity, or other factors.

In an aspect of some embodiments of the invention, utilizing evaporation of water can be used to bring the temperature below the freezing point of some phase change materials (PCM) of the TES. So, while PCM of the TES could be fully solidified, and would otherwise be considered fully charged, evaporation can be used to bring the temperature of the PCM even lower providing greater heat exchange during the next part of the cycle (next day, for example). In a method of the invention, the control system determines or is manually set to utilize evaporation of water to cool the TES to the lowest temperature evaporation can provide.

Using evaporative cooling is in common use in swamp coolers. However, and in contrast, the evaporative cooling systems that operate within buildings, humidity levels within the building are not changed by the present embodiments that use evaporation to cool one or more TESes. Further, humidity levels are not changed by evaporative cooling within any interior air ducts. Swamp coolers, for instance, cool air within a building. But they do so by increasing the humidity. Increasing the humidity decreases perspiration rates, and can cause increases in biological products, such as mold. Swamp coolers are generally used in dry environments for these reasons. The present embodiments can be exclusive from using water and evaporation to cool air within a building, but can also be used in combination with them. In an embodiment, the embodiment comprises a TES used to cool a fluid entering an enclosed space and evaporation of water within the enclosed space. The embodiment may further comprise evaporative cooling of the TES.

It is a further advantage in the present embodiments and methods that cool a TES with evaporation that any water/moisture addition is done at night, as well as to air that does not enter the building. During the warmer day, the air ducting may dry out.

It is an advantage to the present embodiments and methods that the quantity of water necessary to assist in cooling the TES is much less than other common methods of relying on evaporation to cool an enclosed space. The term "assist" here can generally be defined as the evaporative cooling providing less than two thirds of the cooling heat transferred out of the enclosed space. The TES is generally cooled with both evaporative cooling and the 'free' cooling that comes with cooling the TES with cooler nighttime air. Thus, evaporative cooling usually assists in cooling the TES. Also, and because the TES in some of these embodiments and methods provides only a portion of the total cooling heat transfer energy of the entire cooling system, it is clear that the amount of water for evaporation used in these embodiments is less than what a common swamp cooler would use for a given application.

In an aspect of evaporative cooling, the water (or fluid) and/or air may be precooled before water (or fluid) or mist is added to air. In an embodiment, water is cooled by evaporation of water into an air source, then the cooled water is introduced (sprayed, misted, surface of water, etc.) into the air source used to cool the TES.

A further embodiment is Illustrated in FIG. 15. In this embodiment, evaporation of water is used to pre-cool an ambient air source A(1) as it travels through a heat exchanger 65. Water is sprayed or misted into a first flow of air to cool this first air stream. In FIG. 15 this air stream flows through the upper air ducting which exits at A(3). Air stream A(3) is humid air at exit, wherein humid air is air with a higher humidity than the ambient air A(1) entering the device. One or more fans, or other methods of moving air, may be used to move air through the heat exchanger. A fan may either push or pull (or both push and pull) the air stream through the exchanger, and may be upstream or downstream of the airflow. In an aspect, a venturi may be used to further cool the air as it is moved through this first airflow.

In the lower ducting shown in FIG. 15, ambient air entering the heat exchanger 65 comprises a second airflow and is cooled by contact with some conductive surface(s) 64, which is cooled through contact with the cooled air of the first airflow at or after the evaporation step. The conductive surface(s) 64 are cooled in the upper part of the heat exchanger 65 by evaporation of the introduced water to the first airflow. Water is then sprayed, input, or misted into the pre-cooled (and second) air source that is used to cool the TES. Because the second air flow used to cool the TES is both pre-cooled prior to evaporation, and then cooled again by evaporation, it enters the TES cooler than it would be without pre-cooling. This provides greater cooling to the TES which can cool the TES to lower temperatures, or cool it faster, or a combination of both.

In an embodiment, both the air and water are pre-cooled through evaporation before water is introduced to the cooled air that then cools further, and then cools the TES to a lower temperature than non-pre-cooled air and water could achieve. These methods can cool the airflow that cools the TES to a temperature below the wet bulb temperature, which is otherwise the normal limit of evaporative cooling. These methods can cool the TES either quicker, more fully, or to a lower temperature. But these methods require water, so the availability and cost of water can be determined and/or considered. In an aspect of these methods and embodiments, a control system can consider the desirability of water cooling, make determinations to use water, and control how much water is used to pre-cool water or air through known and common means. However, the application of these methods of pre-cooling and its application to cooling a TES are not common.

In an aspect of some embodiments of the invention, evaporator coils often produce water from inside an enclosed space due to humidity in the air condensing (and outside too, if the evaporator is outside). This condensate can be used as a water source for the evaporative methods and embodiments of the invention. In an embodiment, condensate water is routed to the intake airflow cooling system of a TES (FIGS. 15, 61 and/or 63). This can be the only source of water, or it can supplement another source.

In an aspect of the invention and embodiment, the previously described embodiments and methods of using evaporation of water to cool air or water which then in turn cools a second air or water source used in a second evaporation step may be cascaded. For example, the ambient air source A(1) in FIG. 15 (which is cooled by water source 63, exiting as A(3)) may be precooled by the addition of another evaporative step. This air flow being precooled, would then be lowered in temperature further after the evaporative step, which in turn would lower the temperature of the air used to cool the TES.

By theory, an infinite number of steps could exist with the amount of water needed increasing for each step, but the temperature of the air that is used to cool the TES dropping with each step. However, the cooler the air gets, the less evaporation will occur—so there is a practical limit. In an aspect, cascaded evaporative cooling steps can also be applied to other embodiments and methods of evaporative cooling systems, such as cooling the input air flow of the condenser of a heat pump. The availability of water, ambient temperature, and humidity determines the preferability of the number of cascaded evaporative steps.

In an aspect of the invention, some embodiments using evaporation to cool air used to cool the TES may be used in combination with other methods of cooling using evaporation. While some embodiments and/or methods may be defined as being exclusive from other methods to distinctly define the invention.

In an embodiment, an evaporative cooling step is added to a cooling cycle between the condenser and the TES. This will reduce the load on the TES. In an alternative embodiment, a heat pump/air conditioner comprises one or more of the evaporative steps just disclosed at or downstream of the condenser. The one or more evaporative steps may cool the coils of the condenser directly, or may cool a material, such as air flow, that then cools the coils of the condenser. In an aspect of this alternative embodiment, this embodiment may be exclusive from a TES immediately downstream of the condenser. In another alternative embodiment, a heat pump/air conditioner comprises an evaporative step downstream of the TES, wherein the TES may or may not pre-cool the evaporative fluid. These embodiments may be combined and may be combined with other methods of the invention.

Heating

Figure 2:
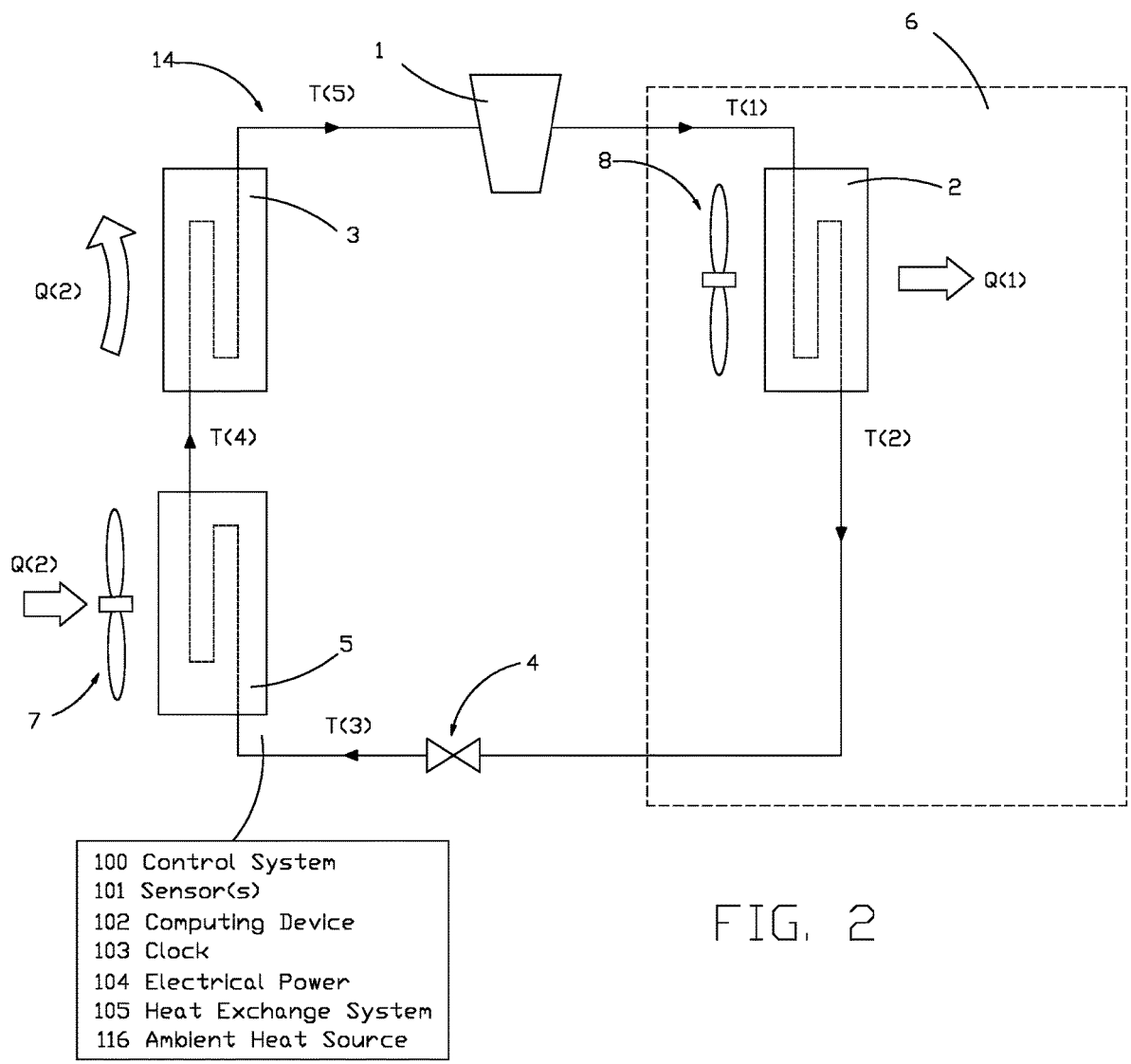
FIG. 2 illustrates a heat pump cycle in heating mode (heater) in accordance with some embodiments.

Heat pumps can be used to provide heating, as well as cooling. FIG. 2 Illustrates an embodiment for the use of heating a space 6, such as a building or vehicle. This embodiment comprises a pressure increasing device, such as a pump or compressor 1, a condenser 2, a pressure reducing device 4, such as a throttle, and a thermal energy storage system (TES) 3. Refrigerant lines 14 connect all of these elements and refrigerant flows through the lines and through these elements. These are the same elements as is the cooling system depicted in FIG. 1. However, in FIG. 2 it can be seen that the direction that the refrigerant 14 is pumped is reversed. In this embodiment, the TES remains in the same position immediately downstream of a heat exchanging device, but this device is now the evaporator 5. (In FIG. 1 the TES is downstream of the condenser.) In this case, heat energy Q(2) is added at both the evaporator 5 and the TES 3 in general operation. This heat energy is then transferred Q(1) to the heated enclosed space 6 from the condenser 2.

In an aspect of the invention, an enclosed space, such as a building, may comprise both a cooling system and a heating system. The heating and cooling systems may be embodiments of the present invention. In this case, two thermal masses TESes are present. Each of these TES elements may comprise different materials best suited for the different requirements of heating during the cooler times of the year, and cooling during the hotter times of the year.

Figure 16:
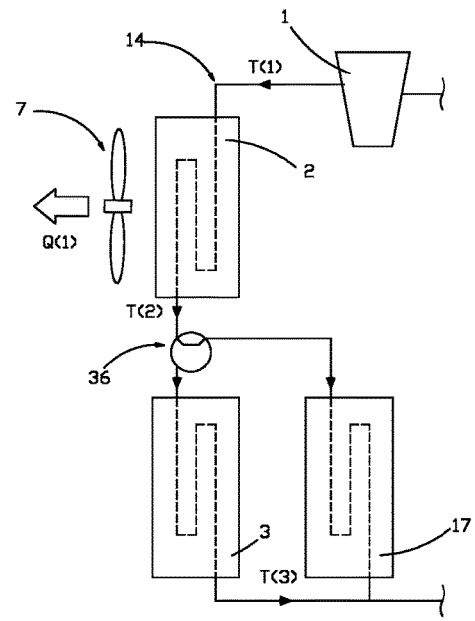
FIG. 16 illustrates a heat pump cycle with a plurality of TES units in accordance with some embodiments.

In an aspect, heating and cooling systems may be combined into one system. In an embodiment, which may be for the use of cooling, heating, or both, the embodiment comprises two thermal mass energy storage units (TESes). These can be arranged serially or in parallel. In the embodiment illustrated in FIG. 16, the two TES units 3 and 17 are in parallel. In this embodiment, a valve 36 controls which TES receives the flow of refrigerant. In an aspect, any common valving or method of directing refrigerant through one TES or the other will suffice.

In an embodiment, one TES comprises different heat energy storage material from the other. One is suited to storing cool energy during the hotter months of the year, when cooling the enclosed space is required. And the other TES is better suited to storing heat energy during the colder months of the year. In an aspect and embodiment, the TESes may comprise PCMs with different material comprising different phase change temperatures.

In an aspect of the invention, a TES may comprise a plurality of materials with some materials being PCMs which may comprise different phase change temperatures. This can broaden the working range of the TES.

For example, and in an embodiment, a TES device comprises two PCMs. One of the PCMs comprises a phase change material that phase changes near the average nightly low temperature during the summer months, and a second PCM comprises a phase change material that phase changes near the average daily high temperature during the winter months. In this case, the same TES can handle both cooling in the summer, and heating in the winter well. The PCM that is optimized for summer will still provide some sensible heat storage capacity during winter operation, and vice versa, even if that material does not phase change during the season that it is not optimized for. So, the total material for a heat transfer application does not necessarily need to be twice that of the material required to handle summer or winter, due to the additional sensible heat storage capability.

Figure 17:
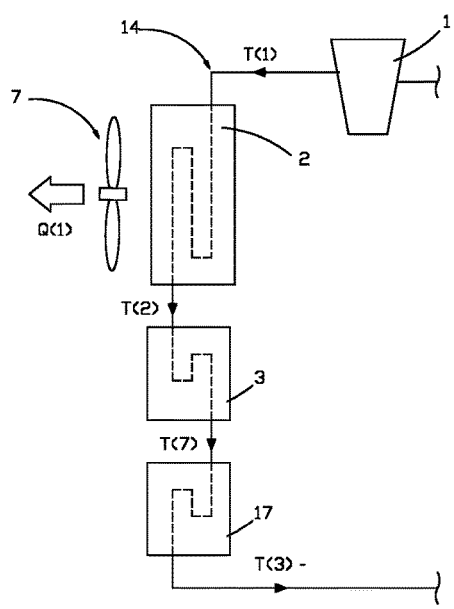
FIG. 17 illustrates a heat pump cycle with a plurality of TES units in accordance with some embodiments

In another embodiment, two or more TESes are arraigned serially. This is illustrated in FIG. 17. These materials may be phase change materials with different phase change temperatures. In an embodiment, each of the two TES units comprise phase change materials with a different phase change temperature. In a cooling application, there is benefit to have the downstream TES 17 have a cooler phase change temperature. In heating applications, the downstream TES 17 should have a higher phase change temperature. If so, then not as much free or applied energy is required to fully charge the second TES compared to one TES with the same total thermal mass, as the second TES is only a portion of the total. The advantage to this is that heat can be exchanged with the first TES 3, and then further with the second. This will cool the refrigerant further in cooling applications, or will heat the refrigerant higher in heating applications. Overall, it takes less energy to cool or heat the TESes during charging times.

In an aspect of some of the embodiments of the invention, a TES is comprised of phase change materials. A TES for heating may comprise a phase change material (PCM) that has a different phase change temperature than a TES for cooling. In an aspect, serial and parallel TESes and TESes with mixed PCM materials may be combined.

In another aspect, the average daytime high temperature for the coldest month of the year is often fairly close in temperature to the average low temperature for the warmest month. In climates where this is true, which is typical for the moderate climates where most of humanity lives, one TES comprising a phase change material with a phase change temperature that splits the difference may be preferable from a cost and materials point of view.

In an example, the climate where the inventor lives has a high average temperature for the coldest month of 54° F. and the average low for the warmest month is 58° F. So, using a phase change material with a phase change close to the range of these numbers would mean that very little heat would need to be transferred actively on average throughout the year to or from the TES to charge the TES. Thus, there is only a small amount of added energy needed to be input to the system to gain the relatively larger benefit the TES provides.

In an aspect of the using heat pumps for heating, the evaporator is generally outside. It is generally known that heat pumps do not function well when ice condenses on the evaporator coils during cold weather—due to frost buildup. There are known solutions, such as reversing flow temporarily to melt the ice. In an advantage of adding a TES to a heat pump cycle, the TES can provide heat input to the system during times when the evaporator's function of absorbing heat is diminished through frost or ice buildup.

In an aspect of heat pumps for heating, auxiliary means of providing heat are often provided for very cold weather, such as switching to using fossil fuels, or electric resistance for heating. In an advantage to a heat pump cycle with a TES, the addition of a TES can extend the times the heat pump can be used for heating, and reduce the times an auxiliary method of heating is used. Also, a heat pump cycle embodiment of the present invention with a TES will be more efficient, as the TES transfers warm air to the refrigerant of the heat pump cycle which in turn provides more heat to the enclosed space. So, these embodiments can maintain an efficiency and monetary advantage over auxiliary methods of heating down to colder temperatures than what a traditional heat pump cycle can provide.

In methods of charging the TES elements of some of the heating embodiments, the control system determines when to charge the TES with heat energy based on high temperature inflections. Further, some of the methods disclosed above for cooling a TES may also be used provided high temperatures and high inflection points are used in place of lows, and heat is added to the TES in place of removing heat. The evaporative methods for cooling above do not apply to heating a TES. But additional direct heat, such as from burning fossil fuels, or electrical resistance may supplement heating a TES. Also, a solar collector may be used to provide heat to heat and charge the TES. These active measures may be combined.

Figure 20:
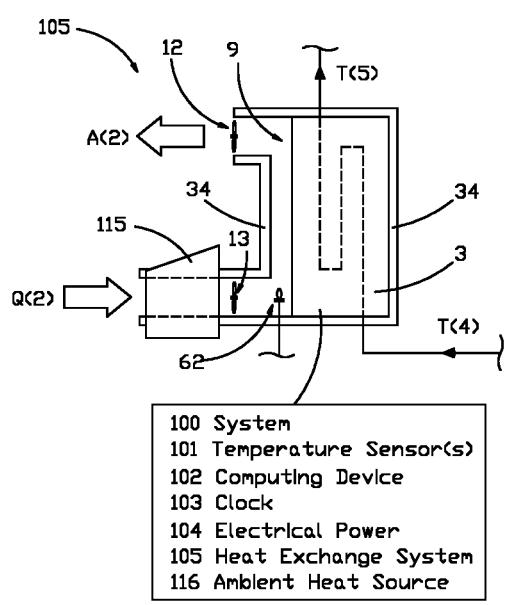
FIG. 20 illustrates a TES comprising a radiant heat collector or emitter in accordance with some embodiments.

FIG. 20 illustrates an embodiment comprising a radiant heat exchanger 115. In an embodiment, the radiant heat exchanger is a common solar collector. The solar collector is heated with radiant energy collected from the sun. The solar collector warms an incoming fluid (air, for example) which in turn then warms the TES. The TES provides heat storage, so in this embodiment, heat storage outside of the TES is not required. In this embodiment, solar power provides a portion of the heat energy required to heat the enclosed space. Further, this embodiment does not need the sun to be shinning for the main heat pump in which the TES is used to provide heat to the enclosed space. This is an advantage over other solar designs. In this embodiment, the heat pump regulates the heating and is not overly dependent on solar absorption and the weather and the system will provide sufficient heat whether or not the sun shines.

Heating and Cooling

In an embodiment, one TES is used for cooling and heating.

Figure 3:
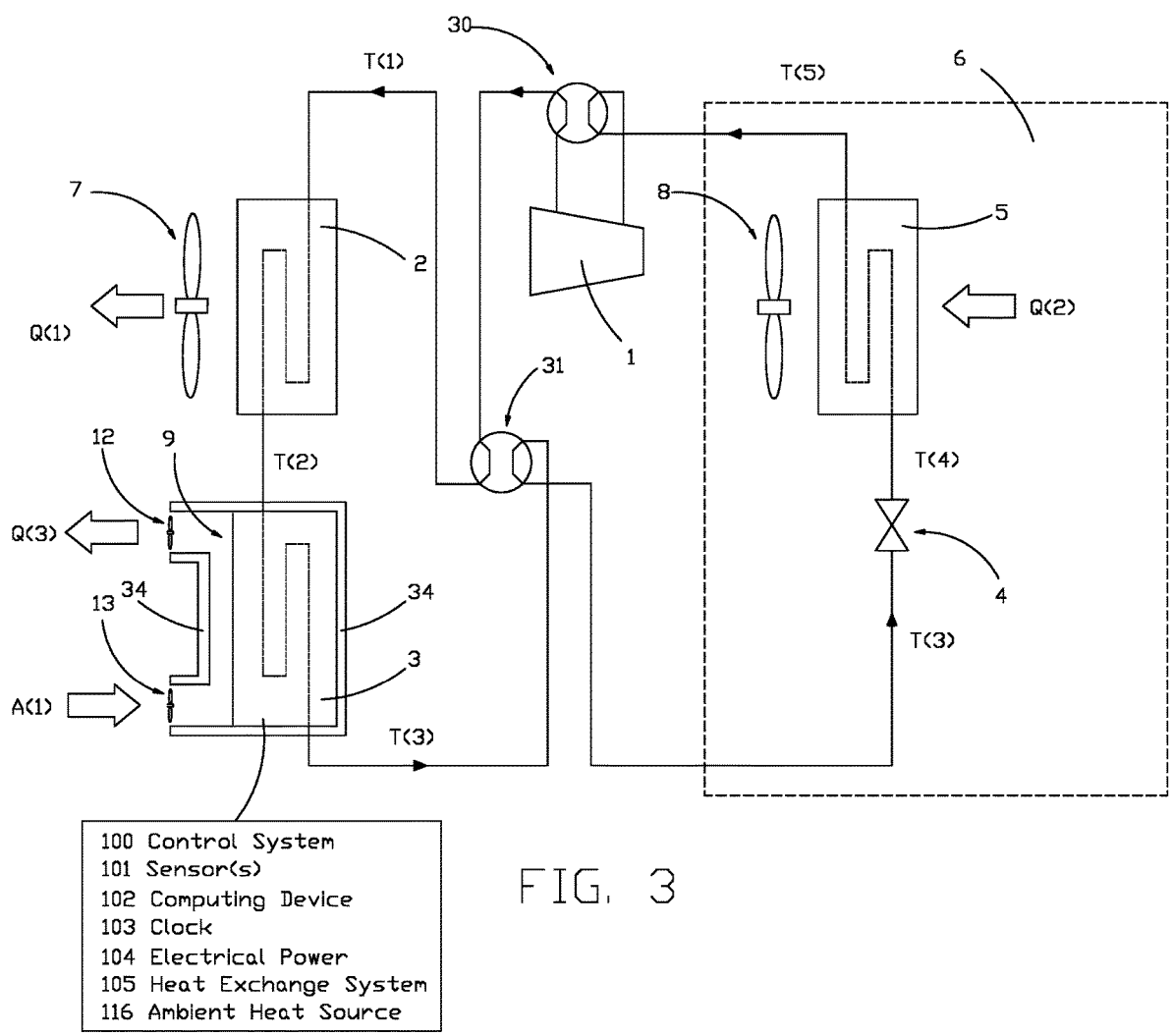
FIG. 3 illustrates a heat pump cycle with reversable fluid flow in cooling mode in accordance with some embodiments.

FIGS. 3 & 4 illustrate a heat pump system that is used for both heating and cooling. Heat pumps that can be used for both heating and cooling are common, and they generally comprise at least one reversing valve 30 to reverse the flow of refrigerant. When the flow is reversed, the evaporator 5 becomes the condenser 2, and vice versa. This is common. Reversing the flow of refrigerant reverses the sides that input and output heat. However, adding a TES to this embodiment is not common. In the embodiment of FIGS. 3 & 4, an additional reversing valve 31 has been added to position the TES downstream of the outside heat exchanger. Wherein the outside heat exchanger is outside of the enclosed space 6. In heating embodiments, the outside heat exchanger is generally an evaporator. And in cooling embodiments, the outside heat exchanger is generally a condenser.

FIG. 3. Depicts the heat pump system providing cooling to the enclosed space 6. FIG. 4 illustrates the reversing valves changing the direction of refrigerant flow to instead provide heat to the space.

FIGS. 3 & 4 both illustrate common vapor compression cycles. However, in an aspect of these embodiments, other heat pump cycles may be substituted, such as a gas heat transfer cycle—a reverse Brayton cycle for example.

In an aspect of these embodiments, more than one pressure reducing device 4 (throttle, for example) may be used to keep these devices close to the heat exchanger that is being used as the evaporator. If there is more than one throttle, each throttle may only throttle in one direction.

In another embodiment, more than one TES can be used serially or in parallel, as is disclosed else ware in this disclosure, while also comprising at least one reversing valve to reverse fluid flow so the heat pump system can be used for heating and cooling, depending on season or desirability. Reversing valves may be combined with many of the embodiments of the invention for this use.

Adding Direct Heat to the TES

In an aspect of some of the heating embodiments of the invention, the ambient outside temperature may not reach a high enough temperature to fully charge the TES during the warmer hours of the day. Provided a phase change material (PCM) is used in the TES, the outside temperature may not induce the desired phase change. For these times, direct heat input 62 (FIGS. 10 & 12) may be used to warm the air enough to cause a phase change. In an embodiment, heat input warms the air used to transfer heat to the TES. The heat input comprises a gas flame, and/or electrical resistance heating. Any common form of direct heat input may also be used. Direct heat is a heat that is not supplied by a free source, such as heat from the air, or a water or ground source.

In an advantage to the method, direct heat input may only be used at a minority of times, if the TES is sized correctly and comprises a material with a PCM that phase changes at a temperature that is beneficial at the majority of times. Thus, in this case a minority of the total energy usage for heating the enclosed space would come from direct heat input.

In an aspect of some of the heating embodiments of the invention, direct heat input may be used at other places in the heating cycle. For example, direct heat input may be added to the incoming air in the evaporator 5 (FIG. 2, 4). Direct heat in this place can be used to keep the evaporator coils from condensing with ice buildup. Also, direct heat could be added to heat the refrigerant exiting between TES 3 and the compressor 1, or between the compressor 1 and the condenser 2 (FIG. 2), or airflow exiting the condenser.

It is common for heat pump systems for heating to switch to other forms of heat when it is too cold outside for the heat pump system to work effectively and efficiently. Examples are switching over to electrical resistance heating or a gas-powered furnace using propane, natural gas, or heating oil, etc. However, it is not common for a heat pump system to use a minority of direct heat input to be able to continue to use the heat pump comprising a TES to continue providing heat down to lower outside temperatures.

In an aspect of heat pumps for heating enclosed spaces, the coils of the evaporator may be warmed with another heat pump during times when frost buildup occurs. In an embodiment, a second heat pump warms the evaporator coils of another first heat pump. In a further embodiment, the second heat pump is an open reverse Brayton cycle heat pump, wherein the second heat pump is exclusive from having a heat exchanger for heat input. Not having this heat exchanger avoids the problem of that heat exchanger having frosting problems in very cold weather. In an aspect of these embodiments, reverse Brayton cycle heat pumps are generally not as efficient as reverse Rankine/Refrigerant cycle heat pumps. But an open reverse Brayton cycle heat pump for the use of warming evaporation coils could only be used during very cold periods of time, and/or could be used for lower temperature differentials (compared to the outside air to inside air differential) as the coils only need to be warmed enough to avoid frosting problems.

Further, heat pumps working serially are known. They have the advantage of moving heat through greater temperature differentials, sometimes with a greater COP than a single cycle would provide. Generally, though, they are the same type of cycle. By contrast, and provided a reverse Brayton cycle moves heat into a reverse Rankine cycle, the reverse Brayton cycle may operate at a smaller differential of temperature than the reverse Rankine cycle. In this case, the reverse Brayton cycle can operate at a similar, or better, COP than the reverse Rankine cycle. The overall COP of the system may be lower than if one cycle were to handle the overall system temperature differential. This method and embodiment of two or more heat pump cycles in serial can be substituted for some of the heat pump cycles disclosed. For example, and in an embodiment, a reverse Brayton cycle moves heat into the reverse Rankine cycle main heat pump and either cycle may comprise a TES. In an alternative embodiment, the embodiment comprising a reverse Brayton cycle moves heat into the reverse Rankine cycle main heat pump does not comprise a TES.

In a method of control, a control system 100 turns on a second heat pump cycle to transfer heat to the input of the first cycle. This can be for the use of avoiding frosting problems on evaporator coils, or for improving overall efficiency of the system of two or more serially arranged heat pumps. Further, the method determines when to operate the second heat pump cycle based on one or more detected or determined temperatures. The control system may also determine how much power is input to the second, and/or first heat pump cycles for maximum benefit.

Methods of TES Control

Regarding determining when to cool the TES, and by how much, a control system 100 can make these determinations based on data 106 that comprises one or more of the following list of alternatives: one or more temperatures, one or more humidity levels, time of day, time of year/calendar, cost of electricity or fuel, previously set values (such as average temperatures or temperatures at a time of day), and any state of the cooling or heating system such as whether or not it is on, if on, is it set for heating or cooling, or for what temperature it is set. In a method, the TES control system determines if the TES should be charged, or not, and by how much and/or for how long. A TES can also determine how much outside resources should be used and when, such as water for evaporation, or fuel, or electricity. In an aspect of the invention, a TES control system may utilize water availability and/or cost to determine if evaporative cooling should be used.

The TES may use controls that are smart controls or use simpler controls. Smart devices are common and generally comprise computing devices which, generally comprise chips (CPU, microprocessor, etc.), at least one clock, memory, instructions, data, and communication means such as wired or wireless connections. A TES control system 100 may be connected to the internet, or other networks, 107 to communicate. A TES control system can be built into the control systems for the main heat pump system, or it can just control the TES separate from the main system.

In an embodiment, the TES is controlled by simple means. Simple means can comprise common controls that let a user or installer set and/or program a controller 108 to turn on or direct elements of the present invention to run at preprogrammed times and/or levels. However, smart controls are preferable.

Figure 21:
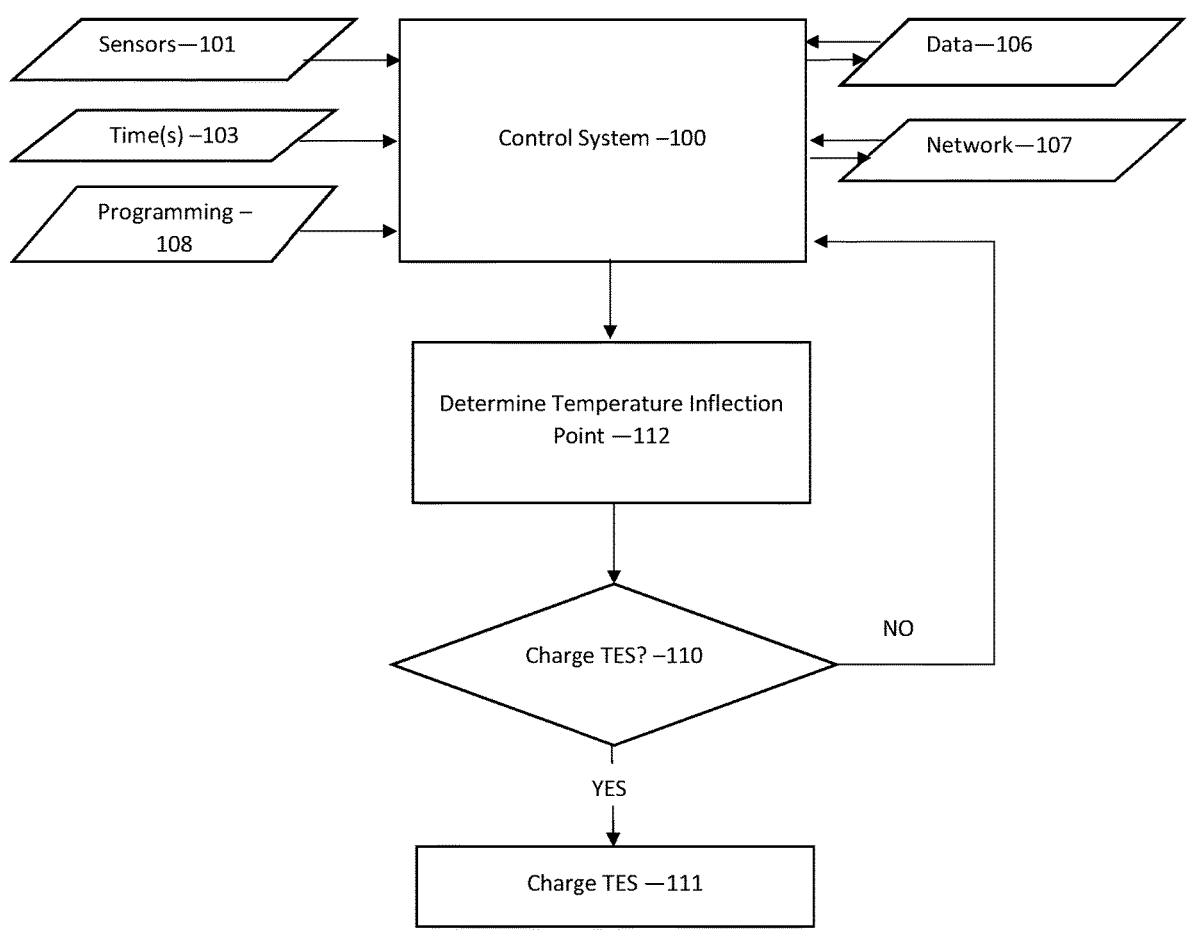
FIG. 21 illustrates a flow chart of some methods of a control system in accordance with some embodiments.

In a method to control the charging (heating or cooling) of the TES, the method comprises determining if the TES needs to be charged, actions to take, and when to take the actions, as illustrated in FIG. 21. In an embodiment, determining if the TES needs to charge 110 comprises receiving temperature data or signals. In an embodiment, some temperature data is received from sensors 101 comprising one or more thermometers that measure the temperature of the one or more TESes. In an embodiment, some temperature data is received from sensors 101 comprising one or more thermometers that measure the temperature of the refrigerant (at one or more of T(1), T(2), T(3), T(4), T(5), T(6), etc., or any combination). In an embodiment, some temperature data is received from a thermometer that measures the temperature of the ambient outside air. In an embodiment, some temperature data is received from a thermometer that measures the temperature of the inside air (within the enclosed space).

In an aspect of the invention, a control system may both control the TES and use the thermal mass of the enclosed space. For example, and in an embodiment for cooling, The control system 100 turns on the compressor 1 when it determines that the TES needs charging and the inside temperature of the enclosed space is above a threshold of temperature, the outside air is above a threshold temperature, and/or the TES is above a threshold temperature, and or the temperature of the refrigerant exiting a heat exchanger is below a temperature. In this example, if the temperature of the refrigerant is below the temperature of the TES, it will charge it with cool energy. Further, the enclosed space will be cooled, and the thermal mass of the enclosed space will be used to keep it cool later.

Likewise, for heating embodiments, the same method and embodiments may be used, but with the thresholds reversed.

In a method of some embodiments, a control system determines and stores some data values in memory. In an embodiment, a data value comprises a running average of temperatures to determine a daily temperature inflection point 112. In this embodiment the daily temperature inflection point is the low temperature of the daily cycle of the last one or more days. In an embodiment, a data value comprises a running average of the high temperature of the daily cycle of the last one or more days. In this embodiment the daily temperature inflection point is the high temperature of the daily cycle. In an embodiment, the control system determines that the running average of the high or low daily temperature is not sufficient to fully charge the TES. Upon this determination, the control system directs the heat exchange system 105 to charge the TES 111 with active measures and/or methods.

In a method of some embodiments, the control system determines the low temperature of the daily cycle by comparing a current temperature, or running average of current temperatures to prior temperatures, which may be a running average of temperatures over a longer period. In an embodiment, the control system determines that the current temperature has passed a low inflection point and is now rising. In another embodiment, a control system has a clock and the low temperature is determined from knowing what time it is. In an aspect of some embodiments and methods of the invention, the control system can be connected to a network, such as the internet, that provides it with the current time. Or a user can set a clock of the control system.

In an aspect of some embodiments and methods of the invention, the control system determines a time of a temperature inflection point predictively. Daily temperature variations generally resemble a sine wave. In a method, the control system uses temperature data at time intervals to predict what the inflection temperature is, and when it will occur. Further, a control system can predict when to charge a TES actively, or passively, and/or by how much based on the determined predictions. In an aspect of the invention, the exact time of day does not necessarily need to be known or set. A control system can approximate times of day from a detected daily cycle of temperatures, which is generally sufficient for determining when, and how much to charge a TES. For example: from at least a determined high and low temperature inflection point, and the times they occur on a system clock (whether or not it is synced to rest of the world), inflection points (temperatures and times) can be stored and/or predicted.

In a method, the control system determines that inflection point temperature of the daily cycle is insufficient to fully charge the TES and directs the cooling or heating system of the TES to actively charge the TES at a specific time. The specific time may be a time or temperature threshold before the low temperature is reached, or at the time of the inflection point temperature, or after. In a method, the control system determines if the daily cycle is insufficient to fully charge the TES by convection and/or convection alone. In a method, the control system determines that active heat transfer is required and calculates and/or estimates an amount of heat transfer to or from the TES needed to fully charge the TES, and determines if the cooling system can supply that heat transfer and/or how much time and/or energy (and/or water) is needed to transfer heat to or from the TES.

In a method, the control system of the TES 100 compares temperature data at specific times of the day to temperature data from one or more previous days to better predict when to charge the TES and/or for how long. For example, the TES control system determines that the current temperature is some degrees above or below the temperature of a previous day at the same time, and adjusts one or more predicted temperatures and/or temperature or time thresholds for use in determining when and/or for how long to charge the TES.

In a method, the control system of the TES learns from some previous days' data how to most efficiently charge the TES. For example, and in a method using evaporation of water, the TES control system learns from previous and/or current data that the TES may be fully charged with respect to a full phase change without using evaporation, and thus water. In a method, the TES control system may then direct water usage for a given time or amount of water to cool a TES below the phase change temperature using sensible heat transfer. In a method, the TES control system may stop water usage when the TES temperature reaches the temperature, or a threshold of temperature from the temperature of the air cooled by evaporation.

In a method, the TES control system learns the phase change temperature of the TES material by determining that the TES has stayed at or near (within a threshold of) a constant temperature for a time threshold, when it is also determined that the ambient air temperature and/or other operating conditions should be transferring heat energy into or out of the TES. In a method, the TES control system uses previous days data to make this determination and store this data.

In a method, the TES control system learns how much thermal mass the TES comprises, and/or how much heat energy needs to be transferred to or from the TES to charge it, and/or how much and/or how long active cooling is required. The TES can also learn the conduction rate of the TES and the TES cooling/heating system. In a method, this is learned from temperature data over time. The results of the learning can be stored as data and be used to better predict cooling/heating requirements of the TES.

In a method of controlling heat transfer in embodiments using two or more TESes (TES units), the control system determines the season, and determines not to charge one or more of the TES units. For example, in an embodiment with a TES with a phase change material suited for cooling in Summer use, the 'Summer' TES will not be charged actively in the Winter. While a second TES—the 'Winter' TES will be charged. This method saves energy.

In a method using fans, as illustrated in FIGS. 3, 4, 8, 12, and 15, a TES control system turns on one or more fans to cool the TES actively. The control system can also control direction of airflow of the fans for reversable fans.

In a method for embodiments that heat a TES, the control system can use common methods for combating frost buildup in heat pumps.

TES Materials (PCMs and/or Other Thermal Mass)

The Thermal Energy Storage (TES) of the present invention comprises one or more materials suitable for storing thermal energy, whether heat or lack of heat (coolness/cold energy storage). Many materials for storing thermal energy exist and are common. Some common materials comprise paraffins, eutectic salts, water, antifreeze, rock, earth, and so on. Some of these materials are phase change materials (PCMs) which are desirable as latent heat transfer during a phase change occurs at a constant temperature, and a smaller amount of material is required to hold a given amount of heat energy.

PCM's are generally preferable. However, non-phase change materials may be readily available at the site of the TES heating and/or cooling system, or more cost effective. For example, earth is almost always available. In existing ground source heat pump systems, earth is often used as a TES. A water source, such as a pond, is also used sometimes. Similarly, earth may be used in a system designed to use the daily temperature cycle. In contrast to a common ground source heat pump, much less earth mass would be necessary. The amount less is in the range of about two magnitudes—a significant amount less. To make a distinction, the amount less a daily cycle TES requires is less than 10% of a seasonal TES for a given application.

In an embodiment, the TES comprises earth. In an embodiment, the earth used is insulated from at least the top surface. As the amount of earth necessary for a daily cycle TES system is relatively small, deep drilling is unnecessary. However, the top few feet of earth normally experience temperatures at, or close to the current daily temperature, instead of temperatures close to the yearly average—that a deep well would provide. So, it is preferable to insulate the earth from at least the top, and cool or heat the earth that comprises the TES in at least one of the same ways as the other embodiments of the invention.

In an embodiment, the top surface of the earth, that comprises the thermal mass of the TES, is covered with insulated glass. Wherein the insulated glass may comprise a plurality of sheets of glass with an insulating gas or vacuum or partial vacuum between layers. The insulated glass may also comprise vaulting between layers that connect with slender columns and provide a vacuum, or partial vacuum between. In this embodiment, some radiant energy is allowed to pass, but conduction and convective heat exchange is significantly retarded.

Another embodiment comprises at least two materials with different radiant absorption and emission rates. The emission of radiation from a surface is often referred to as radiant exitance or radiant emittance. In this embodiment, the material with greater radiant absorption rates is moved to be struck by incoming radiant energy, such as rays from the sun, during the day to heat up when it is desirable to heat the TES up—for heating embodiments. At night, the material with a low emission rate is moved so that radiant energy is not lost from the TES.

For cooling applications, and times of the year when it is beneficial to keep the TES cool, the low emission and low absorption material is moved to reflect heat energy away from the TES mass. At night, this is replaced with the high emission material to emit radiant energy out of the TES, and thus cooling the mass.

Materials that have low emissivity also generally have low absorption, and vice versa. It is a rare material that possesses a difference in the amount of radiant heat it wants to absorb and emit. However, and in an embodiment, such a material with differing rates may be used as the material on a surface of the TES, or a surface of a cooling or heating system for a TES, or under the transparent top cover. These materials are sometimes referred to as selective surfaces. In an aspect of the invention, embodiments that utilize differing emissivity and adsorption rates under a transparent top cover, or other cover, or uncovered, can by used in a TES of any material. In an embodiment, the TES may be cooled by photonic radiative cooling. In an embodiment, the TES is heated by a selective surface with a high absorption rate and a low emission rate. Such materials are in common use in solar heat collectors.

In an embodiment, a material that is transparent to infrared radiation is used on the top cover. This material would allow infrared radiation to radiate out of the TES. In an aspect of some embodiments of the invention, glass is generally transparent to visible light radiation, but opaque to infrared radiation. However, glass generally emits about the same as it absorbs. Thus, a glass cover would absorb infrared radiation radiating out of the TES, but it would then re-emit the radiation. Radiation would happen in both directions, so half would be half re-radiated back into the TES, but it eventually makes it way out. In an aspect, covers can also be placed over a TES.

FIG. 15 illustrates an embodiment with two radiative surfaces 19 and 20. Surface 19 is a radiative surface that comprises a surface and/or boundary of the TES. Surface 20 is a radiative surface that comprises a surface and/or boundary of the TES cooling or heating system. This drawing illustrates two radiative surfaces along with other features, such as evaporative cooling. However, these individual elements can be present or not in any combination. These elements are for the use of cooling or heating the TES, but the surfaces and evaporative cooling are not dependent on each other for operation. In an aspect, radiant collectors or emitters may comprise selective surfaces.

In an embodiment, the radiative surfaces may be selective surfaces. In an embodiment, the surfaces may be insulated. In an embodiment, there may be a plurality of surfaces and the surface presented to the outside world (preferably the sky) may be changed to present the most beneficial side at different times of the daily cycle of night and day, or sun exposure or low or no sun.

FIG. 20 illustrates an embodiment comprising a radiant heat exchanger 115. In an embodiment, the radiant heat exchanger emits radiant energy. The radiant emitter cools incoming air which in turn then further cools the TES. In this embodiment, radiant emission provides a portion of the cold heat transfer required to be removed from the enclosed space. Since the TES is cooled during nighttime hours for many of the embodiments of the invention used for cooling, the radiant emitter can radiate out more energy than it receives. In an aspect, another fluid besides air may be used to transfer heat energy between a TES and a radiant collector or emitter, such as one comprising a selective surface. In an aspect, the radiant collector or emitter can be at a distance from the TES, connected by piping or ducting that contains a fluid flow. For example, a radiant collector or emitter may be placed on the roof of a building, while the TES is on the ground below.

In an embodiment, a TES comprises a packed bed of material, such as rock. Packed beds are common in the art of thermal storage. It is also common to reverse the flow of a fluid, such as water, liquid, gas, or air, between charging and discharging to maintain fairly constant temperature outputs. A packed bed may use less expensive materials, and/or be better for the environment.

In an embodiment, a packed bed comprises refrigerant as the fluid circulating throughout the bed to transfer heat in and out of the packed bed.

Similarly, a TES comprising phase change materials (PCMB) often use a fluid to circulate within the TES to transfer heat energy. It is also common for the PCM to be encapsulated, sometimes in plastic, sometime micro-encapsulated. It is common for a fluid to circulate. For example, the fluid may be circulated by a pump, or by natural convection. In an aspect, a TES may be comprised of different material with different conductivities and/or convectivities.

In an embodiment, the fluid used to transfer heat into and out of a TES for the use of heating or cooling the TES is a refrigerant. In an embodiment, the refrigerant is the same refrigerant as is cooled or heated by the TES. That is to say, there is no separation between the refrigerant of the heat pump system that cools or heats the enclosed space and the cooling/heating system for the TES. FIGS. 13 and 14 illustrate an embodiment where the main refrigerant loop that heats or cools the enclosed space is used to heat or cool the TES. In addition, the TES may comprise a phase change material, which may be encapsulated, and also comprise refrigerant that surrounds the phase change material. In this case the phase change material is a different material from the refrigerant, which is also a phase change material. In an aspect, it uses much less space to have the phase change material be a material that changes between liquid and solid, whereas refrigerant generally changes between liquid and gas.

Ground Source TES

In an aspect of the invention, the TES may comprise a ground source for the use of seasonal storage use. While many of the embodiments of this disclosure are, or may be, exclusive from seasonal ground source TESes, the embodiments of this section comprise them. In an embodiment, a seasonal ground source TES may be charged by utilizing the daily temperature cycle by the embodiments and methods disclosed above. For example, in FIGS. 13 and 14 the TES may be a seasonal TES.

In an aspect of seasonal ground source storage, the ground near the pipes and the pipes themselves may be charged during favorable times: cool night time for the cooling season (Summer) and warmer days for the heating season (Winter). The ground near the pipes, and the pipes themselves may not fully equalize to the surrounding ground temperature. Thus, charging a seasonal ground source TES can provide more favorable temperatures in the ground source TES with which to transfer heat energy.

In an embodiment, active cooling or heating is used to charge the seasonal ground source TES during favorable times of the day. Active cooling or heating may comprise pumping a fluid through the ground source TES to transfer heat energy between the ground source TES and one or more of a list of alternatives comprising: one or more heat exchangers, evaporative cooling, heat pump, solar collector, radiative cooler or heater, or other common means of exchanging heat with the ambient outside air. For example, refrigerant may be pumped and cycled through a solar collector during the day to keep the temperature of the ground source TES higher than it otherwise would be, for heating applications.

These embodiments can reduce the heat gain or loss during a season. For example, a ground source TES will gradually heat up during summer months. This lowers the system efficiency at the end of Summer. In an aspect, the heat of Summer can then be used in Winter in a seasonal ground source TES. In a method, the present embodiments can be used to store heat energy during the 'shoulder' seasons to pre-load the TES. For example, warmth can be stored for Winter in Fall, and cool for Summer in Spring. Many of these embodiments use the daily temperature cycle to move heat during favorable times of the daily cycle to either charge the seasonal ground source TES for daily use or for charging the seasonal ground source TES during shoulder seasons. 'Shoulder' seasons are generally Spring and Fall, although they can be other times of the year near the equator or other locales.

In a method, the control system of the heat pump system or TES determines or predicts future needs for heat or cool storage and pre-loads a seasonal ground source TES.

Heat Reclaimation

In an aspect of the invention, heat energy, or cool heat energy output from the cooling or heating system can be used for other purposes. For example, heat output from a condenser can be captured and used to heat water for domestic hot water. In an embodiment, a condenser of the main heat pump system outputs heat energy to a water tank. The water tank then outputs water to a water heater at a warmer temperature than would otherwise enter the water heater.

Installation

In an aspect of the invention, existing devices and infrastructure can be modified to become embodiments of the present invention. For example, a TES can be added to an existing air conditioning unit or heat pump system. A TES can be added by more than one method.

One method is to remove the refrigerant fluid from the refrigerant lines of an existing heat pump system, then disconnect or create a break in to piping between the outside heat exchanger and whatever device is downstream, flow wise (pressure reducing device, valve, pressure increasing device, etc.). Then insert tubing (pipes) that leads to and from the TES into the existing refrigerant lines. Then refill the system with refrigerant.

Another method and embodiment is to simply connect conductive material to the refrigerant line. Refrigerant tubing lines are generally pipes made of conductive copper. Provided enough tubing is available, a conductive material, such as copper, can be connected, or otherwise placed in contact with the tubing with the conductive material entering and leading into the TES. Heat is then transferred through conduction from or to the main refrigerant tubing and into or out of the TES. Alternatively, the conductive material can transfer heat energy into or out of the refrigerant lines to a transfer medium, such as a fluid (water or antifreeze, for example), which then transfers heat or cold energy into or out of the TES.

In another method, a conductive fluid can be moved over and/or in contact with the main refrigerant lines/tubing. The conductive fluid contained in some ducting or container where fluid transfers heat energy to or from the TES and to or from the refrigerant lines by conduction through the tubing of the refrigerant lines. By these methods of using conduction through existing refrigerant lines, existing refrigerant lines do not need to be cut or disjoined and reconfigured.

Smart Grid Embodiments and Methods

In an aspect of the invention, the electrical grids of the world are changing and often incorporating energy sources that produce less consistent levels of electricity. Smart devices can turn on to store energy for the use of balancing the electrical grid. In an aspect of some embodiments and methods of the invention, the TES systems can be cooled or heated with electrical power to store energy for later use by turning the electrical power into heat or cool storage.

In an embodiment and method, the control system 100 of the TES or heat pump system receives a signal from a network 107. In response to receiving the signal, the control system turns on the active cooling or heating embodiments of the invention 105 to charge the TES 111 and turn electrical energy into heat or cool storage in the one or more TESes, or the thermal mass of the enclosed space. (FIG. 20) In an aspect, the heat or cool storage will not be turned back into electrical energy in these embodiments. These embodiments are for the use of using electrical energy when there is, or will be, an excess of electrical energy in the grid.

Provided there exists a significant number of heat pump systems with TESes, a region could install more PV solar panels than would otherwise be needed for peak supply. The oversupply would occur during peak sunshine hours and times. At these times, the excess electrical generation could be put to useful work. Provided the excess electrical energy is stored as heat or cold in a TES, the heat or cold energy could be put to use later when the main heat pump system operates, providing greater efficiency to the system. During some non-peak sunshine times, when the PV panels are not producing their peak amount, the greater number of PV panels would then supply a greater percent of the energy of the electrical grid.

In a further aspect, the control systems of some of the embodiments of the invention can use the thermal mass of the enclosed space to store energy. For example, in response to receiving a signal, the main heat pump turns on and cools or heats the enclosed space. In a further embodiment, a range of temperatures in the enclosed space is used. Wherein, the control system of the heat pump system with TES will keep the temperature of the enclosed space within that range.

SUMMARY, RAMIFICATIONS, AND SCOPE

The embodiments, methods, examples, and aspects of the embodiments and invention are disclosed herein to describe and summarize the invention, and are not intended to limit the scope of the invention.

The present disclosure generally relates to using thermal energy storage (TES) to improve the performance of heat pump systems. In many embodiments, the daily cycle of ambient temperature is used to charge one or more TES systems. In many embodiments and methods, the TES then improves the efficiency of heat pump systems by transferring heat energy into or out of the TES resulting in output temperatures more favorable to efficient operation of the main heat pump. In general, the cool of night is used to help cool an enclosed space, or the relative warmth of the day is used to help heat an enclosed space. In general, the above embodiments and methods effectively modify the environment in which a heat pump operates.

The disclosed embodiments and methods reduce or eliminate some deficiencies and other problems associated with heat pump operation, as listed above. It is an object of some embodiments of the invention to not only increase efficiency of operation, but in some cases to extend the temperature range in which it is feasible to operate.

Further, some of the embodiments of the invention disclose active measures and methods of overcoming the unpredictability of weather and temperature cycles. This avoids some undesirable effects wherein efficient operation may be inhibited by problems, such as frosting of heat exchanger coils, or extremely hot or cold periods of time. Further, some of the embodiments advantageously use available resources to improve operation, such as using water for evaporative cooling, or radiative heating and cooling.

Many of the disclosed embodiments behave in a manner desired by the user or owner of the heat transfer systems described within. Many of the disclosed embodiments may also be programmed or have automatic controls to behave in a manner desired by the user or owner of the heat transfer systems for the locale in which they are used. Accordingly, the reader will see that heat pumps with added TES systems are a preferred solution for efficiency as well as lowering dependencies on fossil fuels.

The disclosure of the present invention as well as any references to preferred embodiments and other embodiments, are not for limiting the scope of the invention. Persons having ordinary skill in the art may make various modifications and changes without departing from the scope and spirit of the invention. Therefore, the scope of the appended claims should not be limited to the description of the embodiments described above. Accordingly, the scope should be determined not by the embodiments illustrated, but by the claims and their legal equivalents.

I claim:

1. A heat pump system comprising a fluid, one or more lines containing the fluid, a plurality of heat exchangers further comprising a first heat exchanger, a plurality of pressure changing devices that change the pressure of the fluid as it passes through, and at least one TES comprising thermal energy storage and a first TES, and wherein the first heat exchanger is outside of an enclosed space and the first TES is downstream of the first heat exchanger, wherein there is only one line that passes through the first TES; wherein the fluid flows through the first heat exchanger and then flows through the first TES without a substantial change in pressure; and wherein the first TES exchanges heat energy with the fluid in at least one direction, wherein the at least one direction comprises a first direction transferring heat energy to the fluid, and a second direction that transfers heat energy out of the fluid, and wherein the fluid transfers heat energy from an ambient heat source outside the enclosed space into the enclosed space.

2. The heat pump system defined in claim 1, wherein the first heat exchanger is immediately upstream of the first TES and exchanges heat energy with the fluid in the same direction as the first TES.

3. The heat pump system defined in claim 1, wherein at the first TES receives heat energy directly, and not through the fluid, with the ambient heat source during a time interval of a daily temperature cycle when a temperature differential between the outside ambient heat source and the enclosed space is lower than at other times of the cycle.

4. The invention defined in claim 1, wherein the heat pump system comprises a plurality of reversing valves, wherein the reversing valves reverse the direction of flow of the fluid when switched, whereby the heat pump system will move heat into the enclosed space in one direction, and when the valves are reversed, the heat pump moves heat out of the enclosed space.

5. The invention defined in claim 4, wherein the heat pump system further comprises an additional valve for the use of maintaining the position of the first TES downstream of a heat exchanger and upstream of a pressure reducing device for both directions of the flow of the fluid.

6. The invention defined in claim 1, wherein the heat pump system comprises a TES heat exchange system for the use of charging the first TES.

7. The invention defined in claim 6, wherein the first TES comprises some insulation, and at least one shutter to control conductive and/or convective heat exchange between the ambient heat source and the first TES.

8. The invention defined in claim 6, wherein the TES heat exchange system comprises at least one active heat exchange device for exchanging heat between the ambient heat source and the first TES.

9. The invention defined in claim 6, wherein the TES heat exchanger comprises a device using the evaporation of a fluid to cool the first TES.

10. The invention defined in claim 9, wherein the device using the evaporation of a fluid to cool the first TES comprises one or more evaporation steps to precool the air and/or water used to directly cool the first TES.

11. The heat pump system defined in claim 1, wherein the heat pump system comprises a control system, wherein the control system comprising one or more temperature sensors and a computing device, wherein the control system controls heat transfer between the first TES and the ambient heat source.

12. The heat pump system defined in claim 11, further comprising a data network and data, wherein the control system determines when to transfer heat into or out of the first TES from the data that has been received from an outside source.

13. The heat pump system defined in claim 1, wherein the first TES is directly upstream of a pressure changing device.

14. The invention defined in claim 1, wherein the first TES are upstream of a regenerator.

15. The invention defined in claim 1, wherein the first TES comprises a direct heating source for the use of charging the first TES.

16. The invention defined in claim 1, wherein the heat pump system further comprises a plurality of pressure changing devices, wherein work output by at least one of the pressure changing devices is used as a source of work input to a second pressure changing device.

17. The invention defined in claim 16, wherein the work output by at least one of the pressure changing devices is converted to electricity, and the electricity is transferred and converted to work input to the second pressure changing device.

18. The heat pump system defined in claim 1, wherein the first TES comprises at least one phase change material.

19. The invention defined in claim 1, comprising a plurality of TESes, wherein the plurality of TESes are in serial placement.

20. The invention defined in claim 1, comprising a plurality of TESes, wherein the plurality of TESes are in parallel placement.

21. The heat pump system defined in claim 18, wherein the first TES comprise a plurality of phase change materials, wherein a first phase change material has a different phase change temperature than a second phase change material.

22. The heat pump system defined in claim 21, further comprising a valve to switch between two or more of the first TES.

23. The heat pump system defined in claim 1, wherein the first TES exchanges heat energy directly with the ambient heat source during a time when the heat pump system is not exchanging heat with the enclosed source.

24. The heat pump system defined in claim 1, wherein the first heat exchanger moves less than all the heat energy transferred between the enclosed space and the outside ambient heat source over a daily temperature cycle, wherein the initial and ending states of the heat pump system are the same for the cycle.

25. The heat pump system defined in claim 11, further comprising temperature data, wherein the control system determines a temperature inflection point of a daily temperature cycle.

26. The heat pump system defined in claim 25, wherein the control system determines when to actively transfer heat between the first TES and the outside ambient heat source based on at least the determined temperature inflection point.

27. The heat pump system defined in claim 1, further comprising one or more selective surfaces for radiant heat transfer.

28. The heat pump system defined in claim 1, wherein the heat pump system comprises an electrical grid storage device.

* * * * *